US008079044B1

(12) United States Patent
Craner

(10) Patent No.: US 8,079,044 B1
(45) Date of Patent: Dec. 13, 2011

(54) SYSTEMS AND METHODS FOR PROVIDING PARENTAL CONTROL ASSET SEARCHING

(75) Inventor: Michael Craner, Exton, PA (US)

(73) Assignee: Rovi Guides, Inc., Santa Clara, CA (US)

( * ) Notice: Subject to any disclaimer, the term of this patent is extended or adjusted under 35 U.S.C. 154(b) by 395 days.

(21) Appl. No.: 11/401,654

(22) Filed: Apr. 10, 2006

(51) Int. Cl.
*H04N 7/16* (2011.01)
*H04N 7/10* (2006.01)
*H04N 7/025* (2006.01)

(52) U.S. Cl. ............................. 725/28; 725/30; 725/34
(58) Field of Classification Search ............... 725/25–36
See application file for complete search history.

(56) References Cited

U.S. PATENT DOCUMENTS

| | | |
|---|---|---|
| 2,700,065 A | 1/1955 | Evans |
| 2,851,550 A | 9/1958 | Searcy |
| 2,856,474 A | 10/1958 | Norris |
| 3,879,332 A | 4/1975 | Leone |
| 4,012,583 A | 3/1977 | Kramer |
| 4,015,139 A | 3/1977 | Cleary et al. |
| 4,079,419 A | 3/1978 | Siegle et al. |
| 4,081,753 A | 3/1978 | Miller |
| 4,081,754 A | 3/1978 | Jackson |
| 4,156,850 A | 5/1979 | Beyers, Jr. |
| 4,162,513 A | 7/1979 | Beyers, Jr. et al. |
| 4,163,254 A | 7/1979 | Block et al. |
| 4,167,658 A | 9/1979 | Sherman |
| 4,170,782 A | 10/1979 | Miller |
| 4,225,884 A | 9/1980 | Block et al. |
| 4,228,543 A | 10/1980 | Jackson |
| 4,246,495 A | 1/1981 | Pressman |
| 4,247,743 A | 1/1981 | Hinton et al. |
| 4,288,809 A | 9/1981 | Yabe |
| 4,305,101 A | 12/1981 | Yarbrough et al. |
| 4,321,593 A | 3/1982 | Ho et al. |
| 4,348,696 A | 9/1982 | Beier |
| 4,355,415 A | 10/1982 | George et al. |

(Continued)

FOREIGN PATENT DOCUMENTS

AU          B-21592/88          3/1989

(Continued)

OTHER PUBLICATIONS

"Addressable Converters: A New Development at Cable Data," Via Cable, vol. 1, No. 12, Dec. 1981, Cable Data, Sacramento, California.

(Continued)

*Primary Examiner* — Kee M Tung
*Assistant Examiner* — Carlos Perromat
(74) *Attorney, Agent, or Firm* — Ropes & Gray LLP

(57) ABSTRACT

Systems and methods for searching for available assets permitted by parental controls are disclosed. Search results may include assets similar to a reference asset, which may be an asset the user has requested, but which is locked by parental control settings in force on the user equipment. Assets may be ranked according to their similarity, or relevance, to the requested asset, and they may be accessed directly from the search results. Systems and methods for accessing edited or censored versions of the requested asset are also disclosed. An edited content source may store multiple versions of certain assets available in the media system. The appropriate version of the asset may be accessed and presented to the user automatically depending on the user's parental control settings.

45 Claims, 16 Drawing Sheets

U.S. PATENT DOCUMENTS

| | | |
|---|---|---|
| 4,390,901 A | 6/1983 | Keiser |
| 4,425,579 A | 1/1984 | Merrell |
| 4,429,385 A | 1/1984 | Cichelli et al. |
| 4,482,789 A | 11/1984 | McVey |
| 4,484,217 A | 11/1984 | Block et al. |
| 4,484,220 A | 11/1984 | Beetner |
| 4,488,179 A | 12/1984 | Kruger et al. |
| 4,488,764 A | 12/1984 | Pfenning |
| 4,495,654 A | 1/1985 | Deiss |
| 4,510,623 A | 4/1985 | Bonneau et al. |
| 4,528,589 A | 7/1985 | Block et al. |
| 4,536,791 A | 8/1985 | Campbell et al. |
| 4,566,033 A | 1/1986 | Reidenouer |
| 4,573,072 A | 2/1986 | Freeman |
| 4,588,901 A | 5/1986 | Maclay et al. |
| 4,598,288 A | 7/1986 | Yarbrough et al. |
| 4,604,708 A | 8/1986 | Lewis |
| 4,605,964 A | 8/1986 | Chard |
| 4,605,973 A | 8/1986 | Von Kohom |
| 4,620,229 A | 10/1986 | Amano et al. |
| 4,636,595 A | 1/1987 | Smock et al. |
| 4,647,735 A | 3/1987 | Sicher |
| 4,648,667 A | 3/1987 | Baumgart |
| 4,685,131 A | 8/1987 | Horne |
| 4,718,107 A | 1/1988 | Hayes |
| 4,750,213 A | 6/1988 | Novak |
| 4,768,229 A | 8/1988 | Benjamin et al. |
| 4,807,023 A | 2/1989 | Bestler et al. |
| 4,809,393 A | 3/1989 | Goodrich et al. |
| 4,823,385 A | 4/1989 | Hengendorfer |
| 4,855,611 A | 8/1989 | Isobe et al. |
| 4,862,268 A | 8/1989 | Campbell et al. |
| 4,885,775 A | 12/1989 | Lucas |
| 4,888,796 A | 12/1989 | Olivo, Jr. |
| 4,890,320 A | 12/1989 | Monslow et al. |
| 4,890,321 A | 12/1989 | Seth-Smith |
| 4,903,031 A | 2/1990 | Yamada |
| 4,930,158 A | 5/1990 | Vogel |
| 4,930,160 A | 5/1990 | Vogel |
| 4,994,908 A | 2/1991 | Kuban et al. |
| 4,995,078 A | 2/1991 | Monslow et al. |
| 5,001,554 A | 3/1991 | Johnson et al. |
| 5,021,916 A | 6/1991 | Hubbard |
| 5,033,085 A | 7/1991 | Rew |
| 5,038,211 A | 8/1991 | Hallenbeck |
| 5,045,947 A | 9/1991 | Beery |
| 5,046,125 A | 9/1991 | Takizawa |
| 5,051,837 A | 9/1991 | McJunkin |
| 5,053,797 A | 10/1991 | Samuels et al. |
| 5,053,884 A | 10/1991 | Kamijyo |
| 5,056,139 A | 10/1991 | Littlefield |
| 5,068,734 A | 11/1991 | Beery |
| 5,075,771 A | 12/1991 | Hashimoto |
| 5,168,353 A | 12/1992 | Walker et al. |
| 5,172,111 A | 12/1992 | Olivo, Jr. |
| 5,206,722 A | 4/1993 | Kwan |
| 5,210,611 A | 5/1993 | Yee et al. |
| 5,223,924 A | 6/1993 | Strubbe |
| 5,231,310 A | 7/1993 | Oh |
| 5,235,415 A | 8/1993 | Bonicel et al. |
| 5,247,364 A | 9/1993 | Banker et al. |
| 5,253,066 A | 10/1993 | Vogel |
| 5,253,067 A | 10/1993 | Chaney et al. |
| 5,260,778 A | 11/1993 | Kauffman et al. |
| 5,303,063 A | 4/1994 | Kim et al. |
| 5,317,391 A | 5/1994 | Banker et al. |
| 5,357,276 A | 10/1994 | Banker et al. |
| 5,371,795 A | 12/1994 | Vogel |
| 5,384,910 A | 1/1995 | Torres |
| 5,396,546 A | 3/1995 | Remillard |
| 5,425,101 A | 6/1995 | Woo et al. |
| 5,446,488 A | 8/1995 | Vogel |
| 5,465,113 A | 11/1995 | Gilboy |
| 5,477,262 A | 12/1995 | Banker et al. |
| 5,485,221 A | 1/1996 | Banker et al. |
| 5,485,518 A | 1/1996 | Hunter et al. |
| 5,548,345 A | 8/1996 | Brian et al. |
| 5,550,575 A | 8/1996 | West et al. |
| 5,557,724 A | 9/1996 | Sampat et al. |
| 5,579,055 A | 11/1996 | Hamilton et al. |
| 5,583,560 A | 12/1996 | Florin et al. |
| 5,583,576 A | 12/1996 | Perlman et al. |
| 5,585,866 A | 12/1996 | Miller et al. |
| 5,589,892 A | 12/1996 | Knee et al. |
| 5,592,551 A | 1/1997 | Lett et al. |
| 5,594,509 A | 1/1997 | Florin et al. |
| 5,621,456 A | 4/1997 | Florin et al. |
| 5,629,733 A | 5/1997 | Youman et al. |
| 5,664,046 A | 9/1997 | Abecassis |
| 5,699,104 A | 12/1997 | Yoshinobu |
| 5,716,273 A | 2/1998 | Yuen |
| 5,751,335 A | 5/1998 | Shintani |
| 5,781,246 A | 7/1998 | Alten et al. |
| 5,973,683 A * | 10/1999 | Cragun et al. ................ 715/719 |
| 7,130,841 B1 * | 10/2006 | Goel et al. ............................ 1/1 |
| 7,174,126 B2 | 2/2007 | McElhatten et al. |
| 7,293,276 B2 * | 11/2007 | Phillips et al. .................. 725/42 |
| 2003/0115592 A1 | 6/2003 | Johnson |
| 2004/0168121 A1 * | 8/2004 | Matz ............................. 715/513 |
| 2005/0022234 A1 | 1/2005 | Strothman et al. |
| 2005/0028191 A1 | 2/2005 | Sullivan et al. |
| 2006/0130119 A1 * | 6/2006 | Candelore et al. ............ 725/135 |
| 2006/0206912 A1 * | 9/2006 | Klarfeld et al. ................. 725/40 |
| 2007/0150918 A1 | 6/2007 | Carpenter et al. |
| 2007/0261073 A1 | 11/2007 | Blumenschein et al. |
| 2008/0141317 A1 | 6/2008 | Radloff et al. |
| 2009/0133089 A1 | 5/2009 | Ku et al. |

FOREIGN PATENT DOCUMENTS

| | | |
|---|---|---|
| GB | 2 209 417 | 5/1989 |
| GB | 2 210 526 | 6/1989 |
| GB | 2 215 928 | 9/1989 |
| WO | WO 86/01962 | 3/1986 |
| WO | WO 89/12370 | 12/1989 |
| WO | WO 90/15507 | 12/1990 |
| WO | WO 93/11638 | 6/1993 |
| WO | WO 93/11639 | 6/1993 |
| WO | WO 93/11640 | 6/1993 |

OTHER PUBLICATIONS

"A New Approach to Addressability," CableData product brochure, Cable Data, Sacramento, California, undated.

Brugliera, Vito, "Digital On-Screen Display— A New Technology for the Consumer Interface," Symposium Record Cable Sessions of the 18th International Television Symposium & Technical Exhibition, Jun. 1993, pp. 571-586.

CableComputer User's Guide, bearing a date of Dec. 1985 (Plaintiff's Exhibit 289).

Committee on Commerce, "Communications Act of 1995," XP-002100790 Jul. 1995, pp. 1-4.

Daniel F. Walsh Jr., Timing Considerations in RF Two Way Data Collection and Polling, Jerrold-Applies Media Lab, 1989 NCTA Technical Papers, pp. 47-56, 1989.

Daniel H. Smart, Innovative Aspects of a Switched Star Cabled Television Distribution System, British Cable Services Limited, 1987 NCTA Technical Papers, pp. 26-35, 1987.

Federal Communications Commission, In the Telecommunications Act of 1996, Public Law 104-104, effective Feb. 8, 1996, in Section 551, "Parental Choice in Television Programming," XP-002100791.

Gary Libman, Times Staff Writer Chaining the Channels, A New Generation of Television Blocking Systems Allows More Options for Parent, Seeking to Control Kids' Viewing, Los Angeles Times, Aug. 9, 1993.

Gregory F. Vaeth, John Feras, Enertec, Inc., The Addressable Controller of the Future, *General Instruments/Jerrold Communication*, 1990 NCTA Technical Papers, pp. 274-279, 1990.

Jerrold Communications Publication, "Cable Television Equipment," dated 1992 and 1993, pp. 8-2.1 to 8-6 and 8-14.1 to 8-14.3.

M/A-COM, Inc., "Videocipher II Satellite Descrambler Owner's Manual," dated prior to Feb. 1986.

Michael Dufresne, "New Services: An Integrated Cable Network's Approach, Videotron Communication LTEE," *Technical Papers of NCTA 31st Annual Convention & Exposition*, pp. 156-160 (1982).

Richard G. Merrell, Mack S. Daily, An Auto-Dialer Approach to Pay-Per-View Purchasing, Zenith Electronics Corporation, Glenview, Illinois, 1989 NCTA Technical Papers, pp. 34-38, 1989.

Roseville City Council Presentation, bearing a date of Mar. 13, 1985 (Defendant's Exhibit 26).

*StarSight Telecast Inc. User's Guide*, pp. 1-20 (1994).

T. Rzeszewski et al., "A Microcomputer Controlled Frequency Synthesizer for TV." Reprinted from *IEEE Trans. Consum. Electron*, vol. CE-24, pp. 145-153 (1978).

Videocipher Owner's Manual, M/A-Com., Publication No. 4096-048; Model No. VC-2000E or VC-2000E/B, undated.

"Weststar and Videotoken Network Present The CableComputer" (Plaintiff's Exhibit 334).

Family Safe Media, TV Guardian Summary, available at http://www.familysafemedia.com/tv_guardian/ tv_guardian_summary.html(printed Mar. 14, 2007).

Family Safe Media, Compare Profanity Filters, available at http://www.familysafemedia.com/compare_filters.html (printed Mar. 14, 2007).

* cited by examiner

FIG. 11

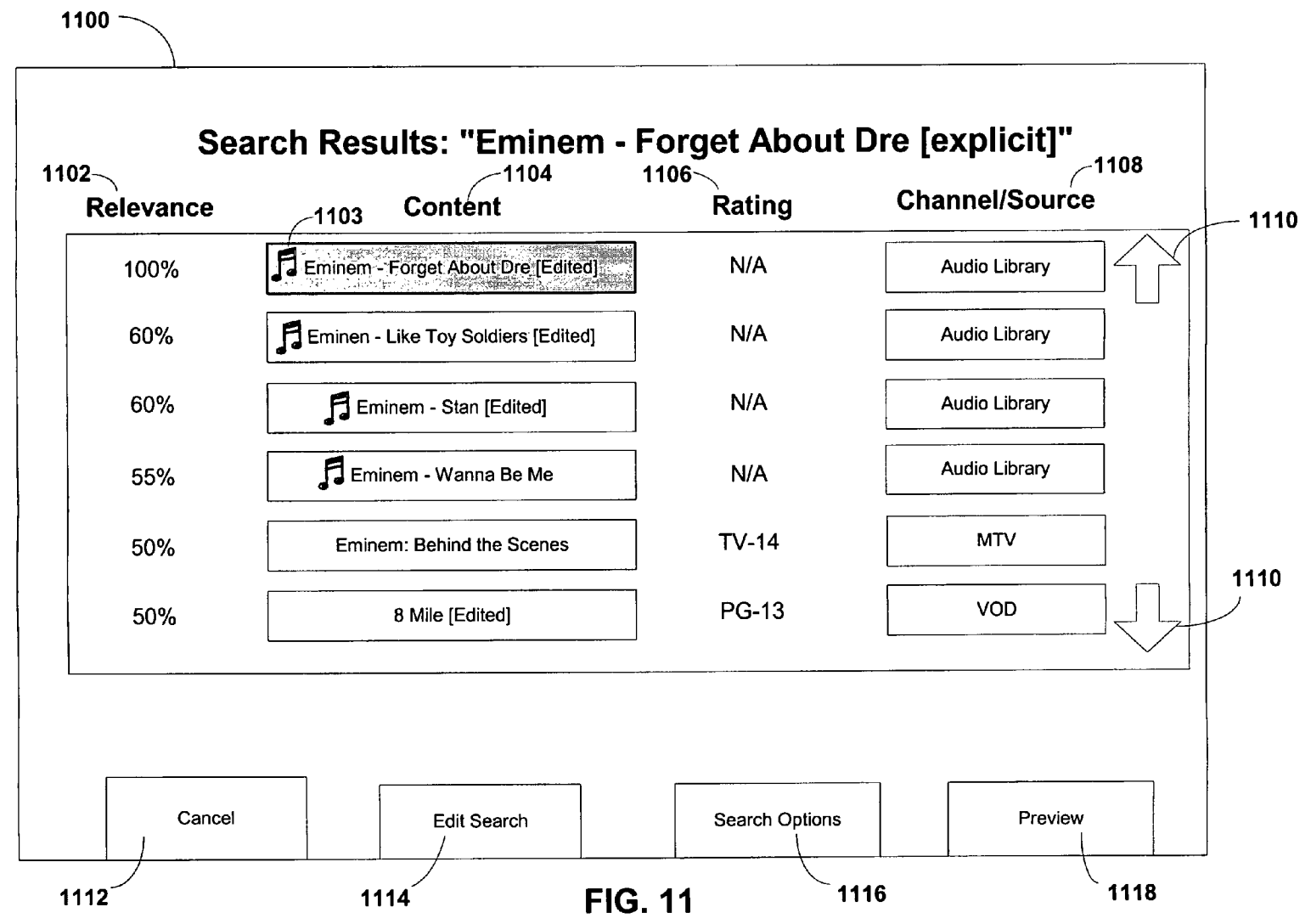

Search Results: "Eminem - Forget About Dre [explicit]"

| Relevance | Content | Rating | Channel/Source |
|---|---|---|---|
| 100% | ♫ Eminem - Forget About Dre [Edited] | N/A | Audio Library |
| 60% | ♫ Eminem - Like Toy Soldiers [Edited] | N/A | Audio Library |
| 60% | ♫ Eminem - Stan [Edited] | N/A | Audio Library |
| 55% | ♫ Eminem - Wanna Be Me | N/A | Audio Library |
| 50% | Eminem: Behind the Scenes | TV-14 | MTV |
| 50% | 8 Mile [Edited] | PG-13 | VOD |

[Cancel] [Edit Search] [Search Options] [Preview]

SYSTEMS AND METHODS FOR PROVIDING PARENTAL CONTROL ASSET SEARCHING

BACKGROUND OF THE INVENTION

This invention relates generally to media systems and, more particularly, to media systems that allow users to search for assets permitted by their parental control settings.

Current media systems, including, for example, television, audio, and gaming systems, allow users to access a wide array of media content. This content may include movies, television programs, music, news, interactive applications (e.g., interactive games), Internet resources (e.g., website, newsgroups, chatrooms), and any other media content capable of being presented on user equipment. This media content may come in many forms, including, for example, broadcast content, on-demand content, and recorded content.

Current media systems also allow authorized supervisors to restrict, or block, access to undesirable content. For example, parents may establish parental controls that limit their children's media access to content below a certain content rating (e.g., the MPAA rating of "PG-13" or the FCC television rating of "TV-14"). Current parental control blocking mechanisms allow parents to lock children out of viewing media content in several different ways. For example, parental controls allow parents to lock specific channels, prohibit shows of specified ratings from being accessed, lock specific types of media content (e.g., on-demand content), or a combination of these methods.

As parental control features are becoming increasingly popular, parents are blocking more and more media content. By blocking more and more media content, users may be restricted to a small subset of the total content available on the user equipment. These users (e.g., children) may become frustrated over the frequent black or blank screens or "locked" dialog or prompts for parental control access codes.

In addition, users of traditional media systems may become disappointed to find their selected media content locked by parental controls. Users may fruitlessly attempt to tune to several locked programs in succession without receiving any media guidance or media suggestions of content that is permitted by parental controls currently in force on the media system.

Accordingly, it is desirable to provide a media system that improves the control users have to locate media assets that are viewable under the existing parental control constraints. It is also desirable to provide systems and methods for automatically searching for permitted assets after a user is blocked from accessing some requested asset due to parental controls. The system may search for content similar to the requested asset or locate edited versions of the requested asset that are permitted by parental controls in force on the system.

SUMMARY OF THE INVENTION

These and other objects of the invention are accomplished in accordance with the principles of the present invention by providing a content control application accessible from the home using user equipment. The content control application may search for, suggest, or automatically access media content and other assets permitted by parental controls in force on the user equipment. In some embodiments, asset search results may meet one or more system-defined or user-defined search criteria, such as similarity to a reference asset. The search results may be presented to the user in order of relevance or similarity to the reference asset or some other asset that is blocked by parental controls.

In some embodiments, the content control application accesses and automatically presents edited versions of blocked content when a user attempts to access content blocked by parental controls. In some embodiments, the media system may automatically edit or censor prohibited content in real-time to create a censored version of the content that is permitted by parental control settings.

Functionality of the content control application may be accessed by local users at the user equipment or by remote users through a web-based portal interface. Media content and parental control search results may also be provided to local or remote users.

As used herein, "content" or "assets" refer to any media or multimedia capable of being displayed, presented to, recorded, or interacted with, using user equipment. This media may include on-demand content, pay-per-view (PPV) content, recorded content (e.g., content available on an attached recording device, such as a digital video recorder), broadcast content, Internet resources (e.g., website, newsgroups, chatrooms), digital audio, news, and interactive applications (e.g., interactive games).

BRIEF DESCRIPTION OF THE DRAWINGS

The above and other features of the present invention, its nature and various advantages will be more apparent upon consideration of the following detailed description, taken in conjunction with the accompanying drawings, and in which:

FIG. 11 shows an illustrative parental control audio search results display screen in accordance with one embodiment of the present invention;

DETAILED DESCRIPTION OF THE PREFERRED EMBODIMENTS

Figure 1:
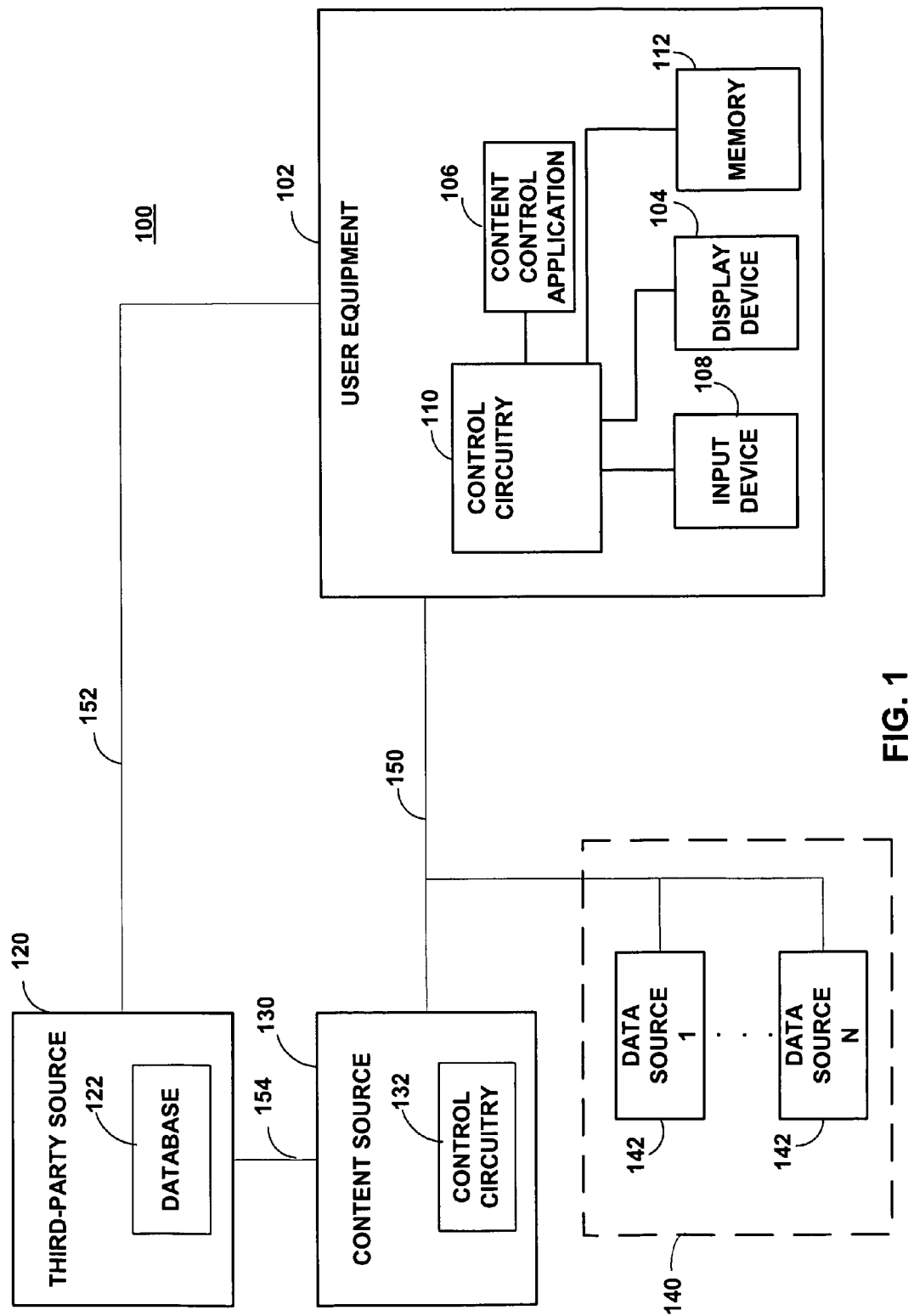
FIG. 1 is a diagram of an illustrative interactive media system in accordance with one embodiment of the present invention.

FIG. 1 shows illustrative interactive media system 100 in accordance with one embodiment of the invention. User equipment 102 receives content in the form of signals from content source 130 and/or third-party source 120 over communications paths 150 and 152, respectively. Any suitable number of users may have user equipment, such as user equipment 102, coupled to content source 130, data sources 140, and third-party source 120. For the clarity of the figure, however, the user equipment of only a single user is shown. In addition, although in practice there may be numerous instances of content source 130 and third-party source 120, for clarity only a single content source and third-party source are shown in FIG. 1.

Content source 130 may be any suitable content source such as, for example, a cable system headend, satellite television distribution facility, television broadcast facility, on-demand server (e.g., video-on-demand (VOD) server), website, game service provider (e.g., for online gaming), Internet or network media/web server, or any other suitable facility or system for originating or distributing passive or interactive media content to user equipment 102. Media content that may be provided by content source 130 to user equipment 102 includes broadcast television programming, VOD programming, music, news, interactive applications (e.g., interactive games), Internet resources and web services (e.g., websites, newsgroups, and chatrooms), and any other media content capable of being displayed, presented to, recorded, or interacted with, using user equipment 102.

Third-party source 120 may be any suitable data source configured to provide media ratings and other parental control information to content source 130 or directly to user equipment 102 via communications paths 154 and 152, respectively. Third-party source 120 may comprise any third-party application provider, data manager, content manager, content aggregator, or intermediate content provider. Third-party source 120 may include database 122 for storing media content ratings information or any other suitable information. Database 122 may also hold content listings and pointers to edited or censored versions of media content. For example, third-party source 120 may provide non-explicit versions of digital audio clips, album songs, or other digital music to user equipment 102 or content source 130. As another example, third-party source 120 may provide edited or censored versions of television programming, feature movies, interactive applications, or any other media content to user equipment 102 or content source 130.

Content source 130 and third-party source 120 may be configured to transmit signals to user equipment 102 over any suitable communications paths 150 and 152, including, for example, satellite paths, fiber-optic paths, cable paths, or any other suitable wired or wireless paths. The signals may be transmitted as a broadcast, switched broadcast, multicast, unicast, or any other suitable transmission stream. Content source 130 may also include control circuitry 132 for performing operations on the signals transmitted by the content source, such as, for example, generating new signals or communicating with user equipment 102 to provide on-demand content and related functionality.

The present invention provides a media system capable of searching for media content that is permitted by parental controls to be displayed or presented on user equipment 102. After attempting to access an asset that is blocked by parental controls, the user may be given an opportunity to search for similar assets that are not blocked by parental controls (e.g., the searched for assets may have a less restrictive rating than the requested asset). In some embodiments, a search may automatically be performed on behalf of the user, and the media system may return a list of recommended assets to the user. In some embodiments, the list of assets is displayed to the user in order of relevance or similarity to the requested locked content that the user recently attempted to access.

For example, a user who attempts to access the movie "Lethal Weapon 4" (an R-rated movie), but has a parental control movie rating lock prohibiting access to R-rated movies, may be presented with a search results display screen listing such recommended assets as the movies "Police Story" and "The Naked Gun 33⅓" (both rated PG-13). As discussed in more detail below, the user may then tune to or access these assets directly from the search results listing. In some embodiments, the content control application may additionally or alternatively present an edited or censored version of the requested asset in lieu of the requested version (which may not be permitted by the user's parental controls). The edited or censored version of the asset may be associated with different ratings information, allowing the version to be presented on the user equipment without violating parental controls.

User equipment 102 may receive interactive content control application data from one or more of data sources 140, content source 130, and third-party source 120. Data sources 140 may provide data for a particular type of content or for a particular application running on user equipment 102. For example, one data source 142 may provide data for an interactive media guidance application and another data source may provide ratings information for a parental control application. In some embodiments, data sources 140 may provide data to the applications running on user equipment 102 using a client-server model. There may be one server per data source, one server for all sources, or, in some embodiments, a single server may communicate as a proxy between user equipment 102 and various data sources 140.

Content source 130, third-party source 120, and data sources 140 are shown in FIG. 1 as separate elements. In practice, their functionality may be combined into a single mechanism and provided from a single system at a single facility, or their functionality may be provided by multiple systems at multiple facilities. For example, content source 130 and data source 142 may be combined to provide broadcast television content and associated broadcast television data or other suitable information.

User equipment 102 may include any equipment suitable for providing an interactive media experience. For example, user equipment 102 may include computer equipment, such as a personal computer with a television card (PCTV). User equipment 102 may also include television equipment such as a television and set-top box, a recording device, a video player, a user input device (e.g., remote control, a keyboard, a mouse, a touch pad, a touch screen, and/or a voice recognition/verification module) or any other device suitable for providing a complete, interactive television experience. For example, user equipment 102 may include a DCT 2000, 2500, 5100, 6208 or 6412 set-top box provided by Motorola, Inc. In some embodiments, user equipment 102 may include a gaming system, a portable electronic device, such as a portable DVD player, a portable gaming device, a cellular telephone, a PDA, a digital music player/recorder (e.g., an MP3 player with recording capabilities), or any other suitable portable or fixed device.

In the example of FIG. 1, user equipment 102 includes at least control circuitry 110, display device 104, content control application 106, memory 112, and user input device 108, all of which may be implemented as separate devices or as a single, integrated device. In addition to content control application 106, other interactive applications, such as an interactive media guidance application, may be implemented on user equipment 102. These interactive applications may direct a tuner in control circuitry 110 to display, on display device 104, the content transmitted by content source 130, third-party source 120, or data source 142 over communications paths 150 and 152 and to provide interactive media application features.

Display device 104 may be any suitable device capable of presenting human-perceivable media, such as, for example, a television monitor, computer monitor, LCD display, video projection device, holographic projector, virtual reality simulator, etc. Display device 104 may also be configured to provide audio and other sensory output and may be incorporated into some device of user equipment 102 (e.g., a cellular telephone or music player display).

Control circuitry 110 is adapted to receive user input from input device 108, execute the instructions of content control application 106, execute instructions from any other interactive media applications, and direct display device 104 to display media content and interactive application display screens and overlays. Control circuitry 110 may include one or more tuners (e.g., analog or digital tuners), encoders and decoders (e.g., MPEG encoders and decoders), processors (e.g., Motorola 68000 family processors), memory (i.e., RAM and hard disks), communications circuitry (e.g., cable modem and ATSC 256QAM receiver circuitry), input/output circuitry (e.g., graphics circuitry), connections to the various devices of user equipment 102 (e.g., content control application 106 and memory 112), and any other suitable components for providing analog or digital media programming and interactive media features. In some embodiments, control circuitry 110 may be included as part of one of the devices of user equipment 102 such as, for example, part of display 104 or any other device (e.g., a set-top box, television, and/or video player).

Control circuitry 110 may be connected to memory 112 for storing data from data sources 140, content source 130, or third-party source 120. This data may include data for use by content control application 106 (e.g., ratings information, access permissions, parental control settings, or any other suitable information). Control circuitry 110 may also be configured to execute the instructions of content control application 106 from memory 112, which may include any type of storage or memory mechanism (e.g., RAM, ROM, hybrid types of memory, hard disks, and/or optical drives).

In at least some embodiments, content control application 106 is implemented in software. However, an implementation of software and/or hardware may be used in other embodiments. These arrangements are merely illustrative. Other suitable techniques for implementing content control application 106 may be used if desired.

Content control application 106 may search for available assets stored or hosted on any suitable device of interactive media system 100. For example, content control application 106 may search for media located locally (e.g., in memory 112 or an attached recording device, such as a digital video recorder) or remotely (e.g., on third-party source 120, data source 142, content source 130, or a remote server). In addition, although in the illustrated embodiment of FIG. 1 content control application 106 is internal to user equipment 102, content control application 106 may be implemented externally or partially implemented externally to user equipment 102. For example, content control application 106 may be implemented at third-party source 120 or content source 130 and may run using a client-server or distributed architecture where some of the application is implemented locally on user equipment 102 in the form of a client process and some of the application is implemented at a remote location in the form of a server process. In other embodiments, content control application 106 is implemented as a standalone application, sub-process, or class (e.g., in an OCAP environment). In this embodiment, the management and functionality of content control application 106 may be invoked directly by another interactive media application (such as an interactive media guidance application) or the underlying operating system after some user input from input device 108. In addition to the aforementioned client-server architecture, the functionality of content control application 106 and/or its related media searches may be implemented as a stand-alone or web-based application or process.

For example, as a stand-alone application, control circuitry 110 of user equipment 102, which executes the instructions of content control application 106, may receive parental control data and media ratings information from data source 142. The parental control data and ratings information may include, for example, parental control settings to be applied to user equipment 102. Parental control settings may be defined on a per-user or system-wide basis (or both). For example, an older child accessing user equipment 102 may be permitted to access movies with an MPAA rating of PG-13 and below, while a younger child may be permitted to access movies with an MPAA rating of PG and below. After either child attempts to access content prohibited by their respective parental controls, control circuitry 110 may direct content control application 106 to search for and display search results for available assets permitted by the current user's parental controls. Control circuitry 110 (or content control application 106) may also perform any related parental control functionality, such as blocking, removing, replacing, or otherwise restricting access to media content and other assets accessible by user equipment 102.

As another example, in a web-based embodiment, a content control application implemented on a web server may receive parental control settings and media ratings information from data source 142 relating to a requested program. The content control application may then issue parental control commands using the web server, which may then display the results of the commands to the user. In this way, a user may access all the functionality of content control application 106 from a remote location.

Figure 2:
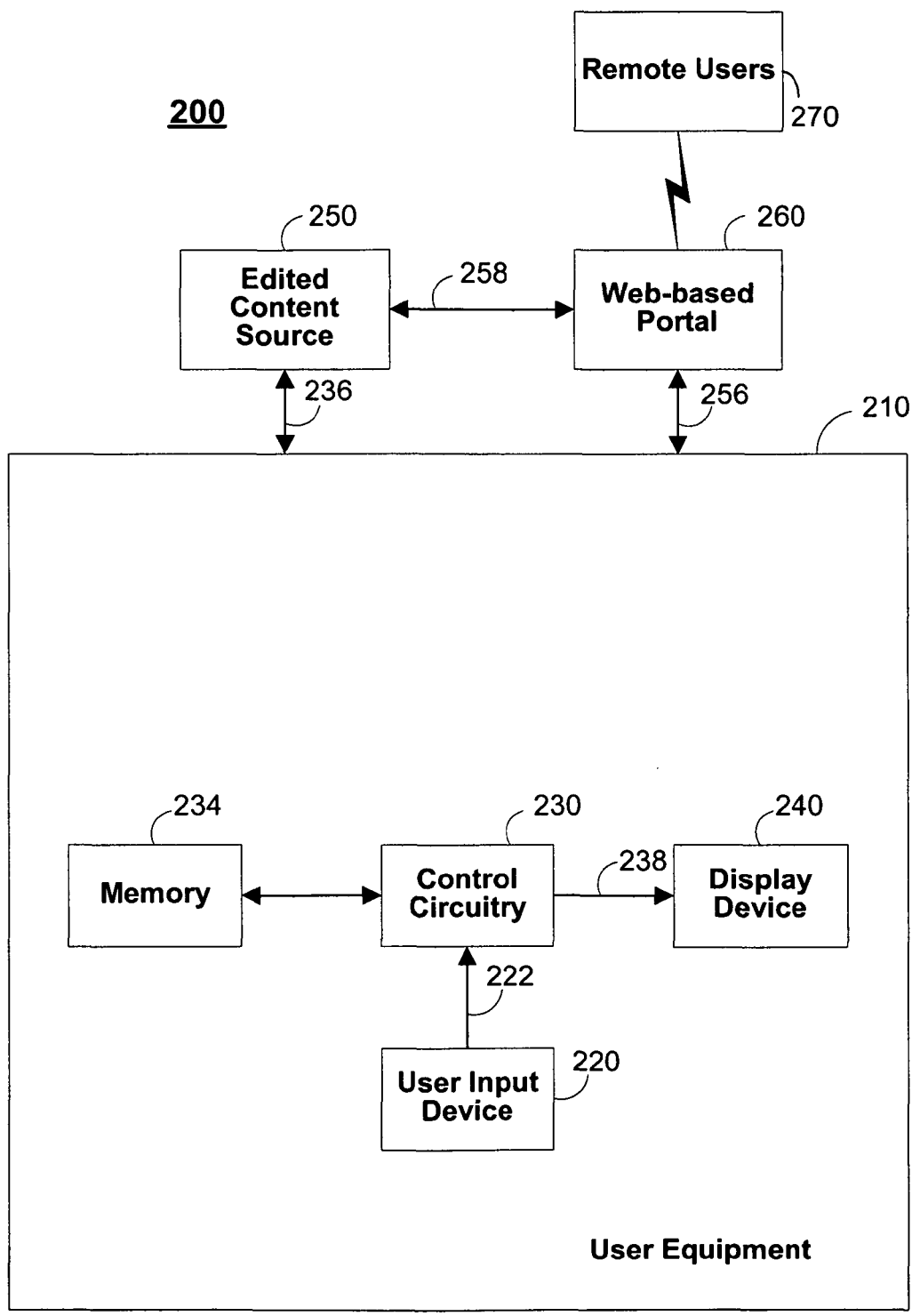
FIG. 2 is a diagram of an illustrative interactive media system with access to edited content sources in accordance with one embodiment of the present invention.

FIG. 2 is a simplified block diagram of one embodiment of interactive media system 200 in accordance with one embodiment of the present invention. Interactive media system 200 may include user equipment 210, edited content source 250, web-based portal 260, and remote users 270. In some embodiments, edited or censored versions of media content are made available on edited content source 250. For example, an "edited for radio" version of an explicit audio selection may be stored on edited content source 250 for access by user equipment 210. As another example, an "edited for television" version of an R-rated feature movie may be stored on edited content source 250. In some embodiments, content source 250 may be part of content source 130 (FIG. 1). User equipment 210 may access edited or censored versions of assets from edited content source 250 automatically (e.g., on-demand) whenever a user at user equipment 210 attempts to access a particular asset prohibited by the user's parental controls. In some embodiments, edited content source 250 contains multiple versions of the same asset, each version with different ratings information.

Although FIG. 2 illustrates one edited content source for clarity, interactive media system 200 may include more than one edited content source and/or additional types of servers that interface with user equipment 210 (e.g., program guide servers, web servers, etc.). For example, one content source could store media content of a particular ratings criteria (e.g., all R-rated movies), while another content source could store media content of a different ratings criteria (e.g., all PG-13-rated movies). Users of user equipment 210 may be granted access to individual content sources as permitted by their parental control settings.

Edited content source 250 communicates with user equipment 210 over communications path 236. Communications path 236 may be a satellite path, a fiber-optic path, a cable path, an Internet Protocol (IP) path, or any other suitable wired or wireless path. Data (e.g., an on-demand content stream or on-demand-related messages) is sent or exchanged via communications path 236 using a synchronous delivery mechanism (e.g., MPEG-2 transport over a hybrid-fiber coax network), an asynchronous delivery mechanism (e.g., store-and-forward, best-effort, or Internet Protocol (IP)), or a combination of synchronous and asynchronous delivery mechanisms. Although communications path 236 is shown as a single path for clarity, communications path 236 may include multiple paths (e.g., multiple IP paths between user equipment 210 and multiple distributed edit content sources 250).

In practice, there may be many installations of user equipment 210, but only one has been shown to avoid over-complicating the drawing. User equipment 210 may be any in-home equipment suitable for providing interactive media functionality, such as a suitably equipped television, set-top box, digital video recorder (DVR), personal video recorder (PVR), or PCTV. Whatever the chosen equipment, user equipment 210 may include at least user input device 220, control circuitry 230, memory 234, and display device 240. User input device 220 may be any suitable device or combination of input devices including, for example, a remote control, a keyboard, a mouse, a touch pad, a touch screen, or a voice recognition interface. Display device 240 may be any suitable device configured to provide for the output of video, audio, or other sensory output, such as, for example, a television, plasma display, LCD, computer monitor, or holographic projector.

Communications path 238 may be any suitable display interface such as, for example, an analog composite or RGB interface, a Digital Visual Interface (DVI), or a FireWire Interface (IEEE 1394). Communications path 222 may be any suitable wired or wireless path (e.g., an infrared path).

Control circuitry 230 may include a processor, such as a microprocessor, and any other suitable circuitry for providing on-demand-related functionality, including, for example, caching circuitry, video-decoding circuitry, direct memory access circuitry, input-output circuitry (including communications circuitry for communicating with edited content source 250 over communications path 236), decryption circuitry, and transcryption circuitry.

Memory 234 may be any suitable storage device or combination of coupled storage devices for storing parental control settings, asset ratings information, on-demand client programming logic, on-demand content data (e.g., titles and descriptions, etc.), and on-demand content including, for example, RAM, a flash memory, a hard disk drive, removable storage media, a CD-ROM, or a networked drive on an in-home entertainment network.

In some embodiments, control circuitry 230 may execute an on-demand client to perform multiple functions, including: (1) receiving commands from user input device 220 over communications path 222 and either sending the commands to edited content source 250 or processing the commands locally, (2) playing back on-demand content from memory 234 and/or edited content source 250, (3) caching on-demand content in memory 234, and (4) controlling the playback of on-demand content from the cache in memory 234, or from edited content source 250, in accordance with a user's commands. In some embodiments the on-demand client is part of, or communicates with, an interactive application, such as an interactive media guidance application, via a suitable API.

In a typical use scenario, a user of interactive media system 200 selects content for playback using user input device 220. User input device 220 sends a signal to the control circuitry which, in response, analyzes the user's current parental control settings (or the parental controls currently in force on the user equipment). If the requested asset is permitted by the current parental control settings, the asset is accessed and presented on user equipment 210. If the content is not permitted by the user's parental controls, the system may perform multiple functions, including one or more of the following: (1) inform the user that the requested asset exceeds one or more parental control locks or settings, (2) present a prompt to the user to search for content similar to the requested content that is permitted by the user's parental control settings, (3) automatically search for similar permitted content without prompting, and (4) automatically access edited content from edited content source 250 and present the edited content on user equipment 210.

Remote users 270 may also access media search functionality and edited content via web-based portal 260. In this embodiment, content control functionality may be accessed via a remote interface separate from the traditional media guidance or content control interface. The remote interface may be useful for parents or remote users who are not physically located near the user equipment, but still wish to configure parental control locks and settings, access edited content, and/or retrieve media search results. Web-based portal 260 may include any network-based portal, node, terminal, server, or peripheral capable of communicating with edited content source 250 or user equipment 210. For example, remote users 270 may access web-based portal 260 via a standard web interface or browser, such as Internet Explorer. Web-based portal 260 may authenticate remote users 270 and relay content control commands to user equipment 210 or edited content source 250 via communications paths 256 and 258, respectively. Communications paths 256 and 258 may include any suitable communications paths, such as encrypted Internet tunnels.

Remote users 270 may issue any command capable of being issued from user equipment 210. For example, remote users 270 may configure parental control settings on user equipment 210, search for media content permitted by their parental control settings (or the parental control settings in force on user equipment 210), and access edited media content from edited content source 250.

Figure 3:
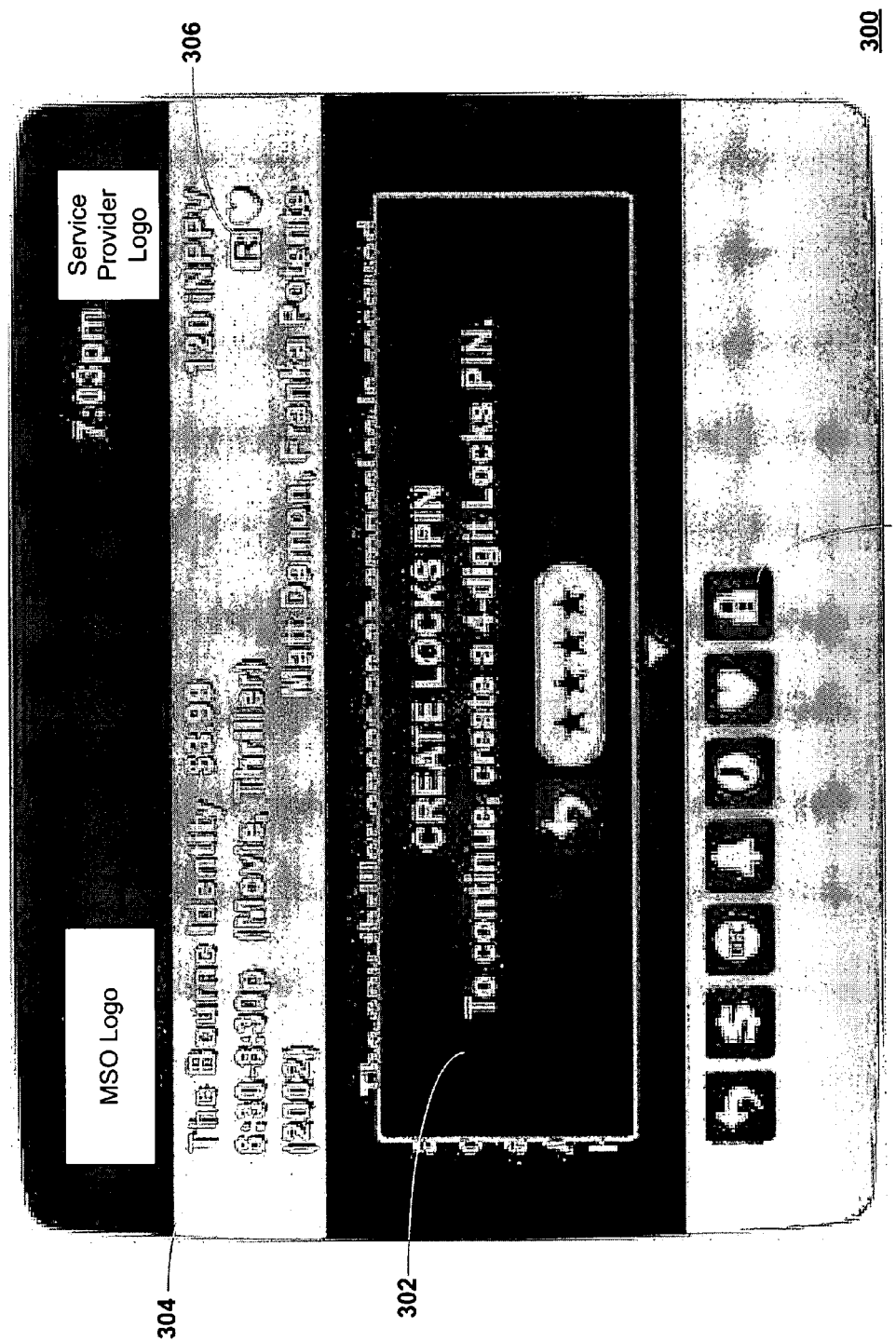
FIG. 3 shows an illustrative parental control access code creation display screen in accordance with one embodiment of the present invention.

FIG. 3 shows illustrative display screen 300 prompting a supervisor to create an administrative parental control access code, such as a personal identification number ("PIN"), for accessing the content control application in privileged mode in accordance with one embodiment of the invention. When accessing the content control application for the first time or requesting any parental control functions when no parental control access code is currently set, an administrative parental control access code may be created. This parental control access code will be required for all subsequent administrative content control access requests. In the depicted embodiment, the parental control access code is comprised of four numeric characters; however, any number of numeric or alphanumeric characters may be used as an administrative parental control access code. Users may input data into create parental control access code prompt 302 using any available input device (e.g., remote control, keyboard, or mouse) or via a recognition and verification module (e.g., for voice, fingerprint, or iris). For example, as is understood in the art, a voice recognition module utilizes an attached microphone to translate common phonemes into data characters and commands. The voice verification module may compare the inputted phonemes to voiceprints already stored on user equipment 102 (FIG. 1). These stored voiceprints may have been established in advance via a voice training process. If an acceptable voiceprint match is found, access to the interactive content control application's privileged menu may be granted without the use of a manual parental control access code entry. A user may also navigate through the menu overlays, input data, and control the interactive content control application via voice if desired.

As depicted in FIG. 3, create parental control access code prompt 302 may be displayed on top of another interactive application, such as a media guidance application. In some embodiments, create parental control access code prompt 302 may be integrated with an interactive media guidance parental control access code prompt or overlay (e.g., the VOD ordering access code overlay or another parental control access code overlay used with an interactive media guidance application). In this way, all parental control access code entry and creation prompts may be identical and seamlessly integrated with an existing (e.g., "master") parental control access code prompt already resident on the user equipment. In other embodiments, the create parental control access code prompt may be displayed directly by the content control application on top of content being viewed. In the example of FIG. 3, the user has attempted to access a parental control feature from within a program information display for program 304 with content rating 306 by selecting icon 308. Because no parental control access code is established for the system, the content control application provides create parental control access code prompt 302 to create a new parental control access code.

Supervisors may access the content control application and be presented with create parental control access code prompt 302 in a number of ways. For example, in some embodiments, to access the content control application the supervisor may: 1) press a special input key or command (or a series of keys or commands) on input device 108 (FIG. 1); 2) select an on-screen icon (such as icon 308); 3) be automatically linked to the content control application from another interactive application; or 4) speak a pre-determined word or voice command (such as "parental locks").

Figure 4:
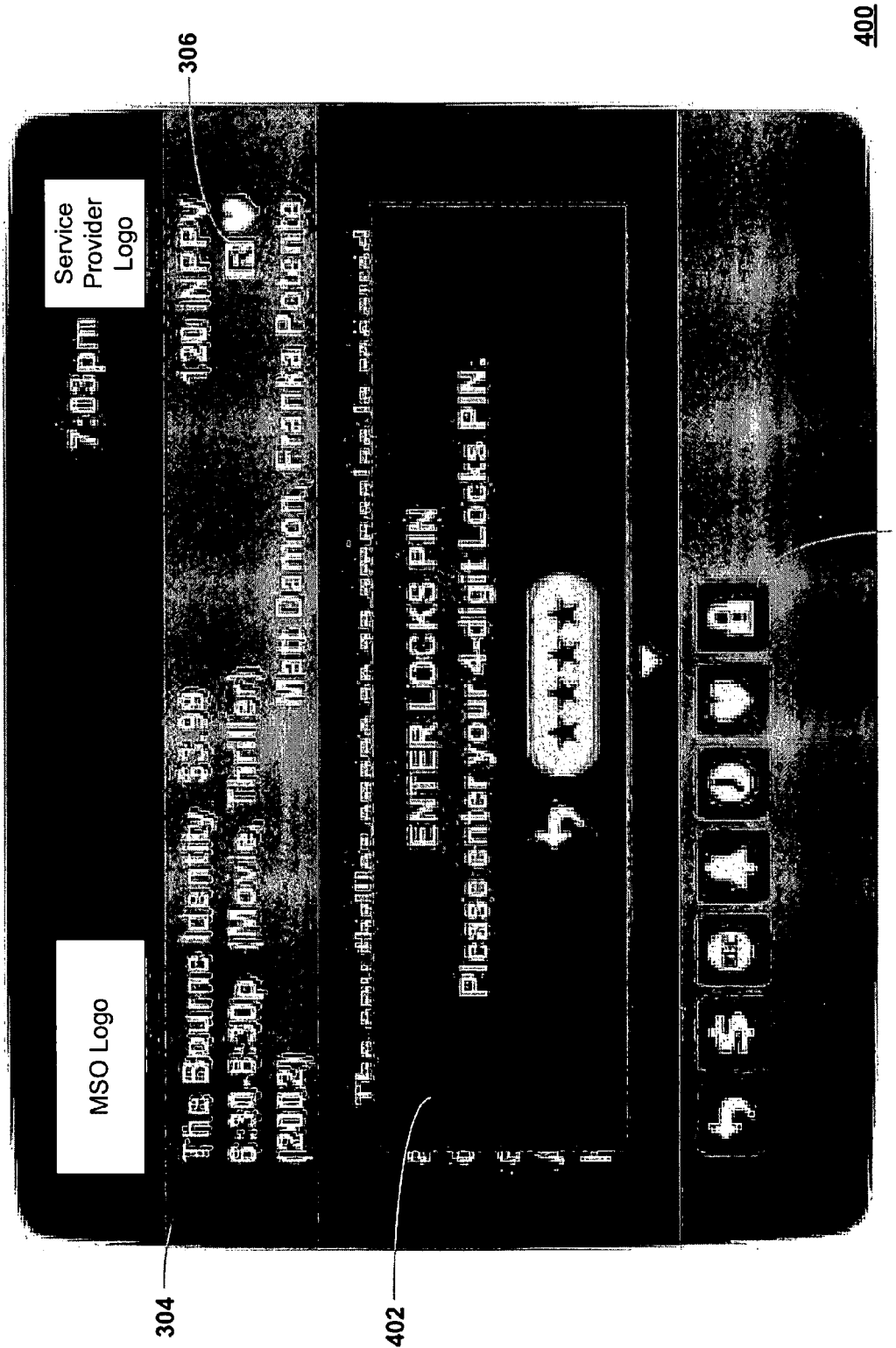
FIG. 4 shows an illustrative parental control access code prompt display screen in accordance with one embodiment of the present invention.

FIG. 4 shows illustrative display screen 400 prompting the user to input the parental control access code in accordance with one embodiment of the invention. After the initial parental control access code creation process, subsequent attempts to access parental control features or locked media content may require valid input into parental control access code entry prompt 402. This prevents unauthorized users (e.g., children) from changing their parental control settings or accessing unauthorized media content without authorization. Parental control access code entry prompt 402 may be presented to the user before all parental control functions, including viewing and/or changing parental control settings for the current user or another user.

In one embodiment, a single administrative parental control access code is used to access all parental control functionality; however, authorized supervisor and supervisor groups may be created with varying levels of access to the content control application. For example, some supervisors may view and edit all parental control settings stored on the system, while other supervisors may only have access to view and edit the parental control settings for users they have been delegated access rights. As another example, some supervisors may view parental control settings only, while other supervisors may view and/or edit the settings. Each supervisor may have a personal, unique parental control access code. Content control application 102 (FIG. 1), control circuitry 110 (FIG. 1), or a network authentication node may validate each parental control access code entry and grant the appropriate permissions level to each supervisor.

In some embodiments, parental control access codes may also be given to users (e.g., children) of the system in order to access media and other assets. For example, when a user attempts to access media content not permitted by the user's parental controls, prompt 402 may be displayed to the user for authorization. For example, the user may be attempting to access program 304, which may be associated with content rating 306. The current user which may not be permitted by the user's parental controls (or the parental controls currently in force on the user equipment) to access assets with rating 306. For example, rating 306 (which in the example of FIG. 4 is the MPAA rating R) may exceed the user's parental control settings. Supervisors may distribute parental control access codes to users so that users may access selected assets even though the assets may be prohibited by the users' parental controls. These "user" parental access codes may be limited in that they allow access to locked media content, but they do not allow access to view or edit parental control locks and/or settings.

In some embodiments, user parental control access codes may be associated with expiration dates or other expiration criteria. Additionally or alternatively, user parental control access codes may be valid for a single use or a limited number of uses. For example, a parent may give a child a user parental control access code to access a single media selection, such as a broadcast show, on-demand movie, or recorded program that the user would be otherwise incapable of accessing (due to parental control locks). The access code may automatically expire after the first use (or a limited number of uses). Once the access code has expired, a user must obtain another valid access code from an authorized supervisor in order to view additional content exceeding the user's parental control settings.

As another example, user parental access codes may expire after a certain usage criteria has been met. For example, one user parental access code may allow the current user to access a single PG-13-rated selection and five PG-rated selections. To simplify the expiration criteria, a media point system may be defined to monitor each user access code and the remaining media balance. For example, in one embodiment, R-rated content may correspond to 100 media points, PG-13-rated content may correspond to 25 media points, PG-rated content may correspond to 10 media points, and G-rated content may correspond to 5 media points. As a user accesses various media selections using the same user access code, the content control application may keep track of the access code's remaining balance. Once the balance reaches zero, the access code may be automatically deactivated and media content access may be restricted. In this way, parents can not only monitor what content their children are watching, but also how much content they are watching. Additionally or alternatively, balances may be considered credits toward entertainment usage for a given interval (e.g., a day, week, or month), and credits may be refreshed or refilled to a given level set by an administrator every day, week, month, etc.

Similarly, the content control application may monitor other forms of content using the media points system. Websites, Internet chatrooms, newsgroups, and interactive games and applications may be assigned a certain number of media points by an authorized supervisor. For example, the website www.pbskids.org may be assigned a lower number of media points than the website www.myspace.com. Each time a user accesses one of these websites, media points may be deducted from the user's access code balance. Additionally or alternatively, these websites may be assigned ratings by the supervisor, similar to the MPAA ratings common to motion pictures. The content control application may present prompt 402 to the user whenever a website exceeds the user's parental control settings or the user access code balance is insufficient to access the website. In this way, website and other Internet activity may be limited to discourage, for example, excessive online chatting and instant messaging. By assigning a higher number of media points to potentially harmful or undesirable websites (e.g., online dating websites), supervisors may discourage frequent accesses to these websites.

Figure 5:
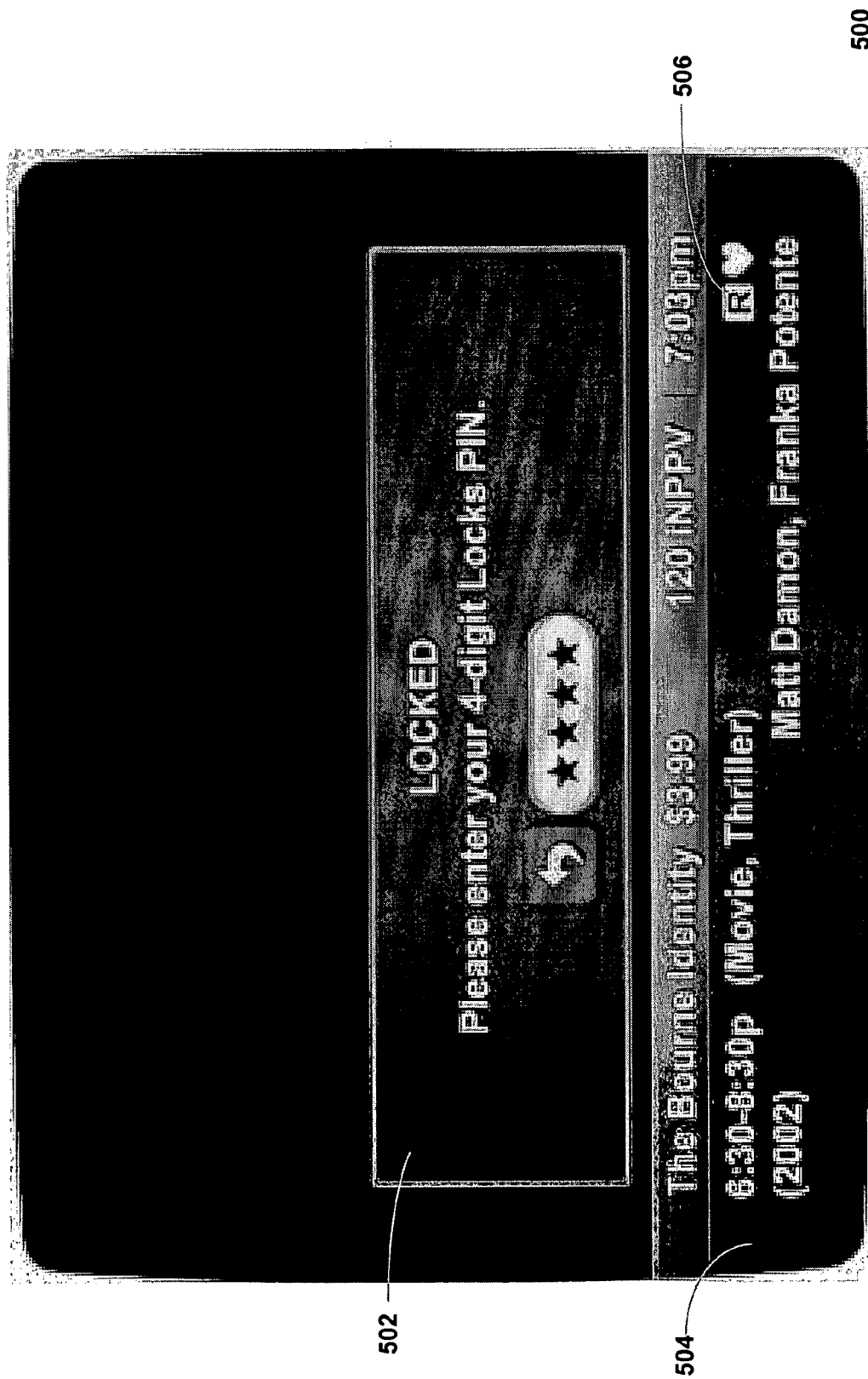
FIG. 5 shows an illustrative blocked parental control display screen with a parental control access code prompt in accordance with one embodiment of the present invention.

FIG. 5 shows illustrative display screen 500 prompting a user to enter a parental control access code in accordance with one embodiment of the invention. Prompt 502 may be displayed whenever a user attempts to access content not permitted by the user's parental control settings. For example, if rating 506 for movie 504 is locked in movie rating locks 608 of FIG. 6, then parental control access code prompt 502 may be displayed to the user. Prompt 502 may be displayed to the user at other times as well. For example, if a user's media point balance is insufficient to access a requested program, prompt 502 may be displayed so that the user may enter another user access code.

Figure 6:
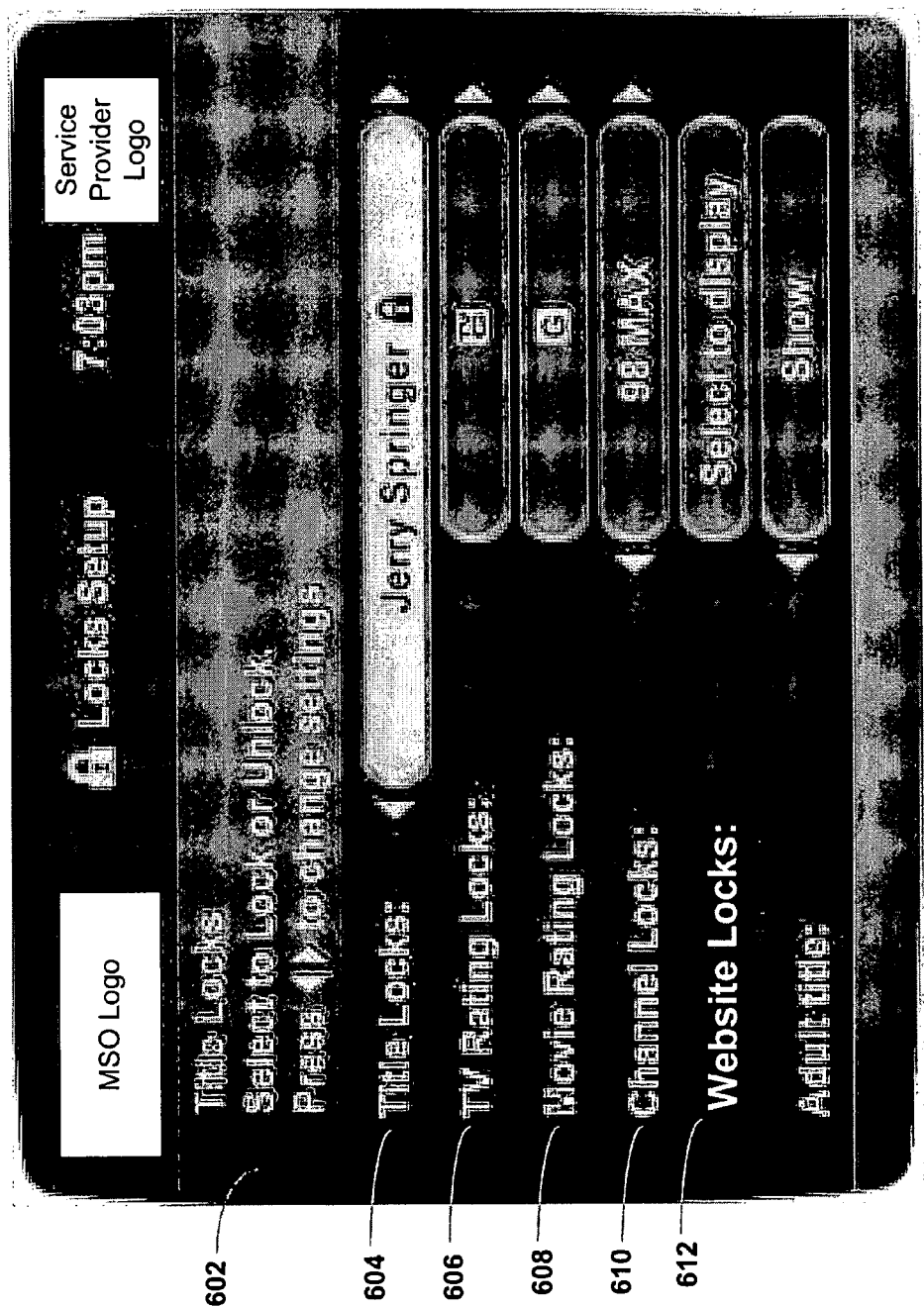
FIG. 6 shows an illustrative parental control locks setup screen in accordance with one embodiment of the present invention.

FIG. 6 shows illustrative locks setup display screen 600 used to customize parental control settings for the current user in accordance with one embodiment of the invention. Each user of the user equipment may have personalized parental control settings or the user equipment may have a single parental control policy in force for all users (or both methods may be used). If more than one user is defined, users may be authenticated upon accessing or powering on the user equipment using a standard username and password combination, a verification module (e.g., voice, iris, or fingerprint verification), or any other convenient method. Users may be authenticated at other convenient times as well. For example, in one embodiment, users are automatically logged out of the system after a supervisor-specified period of inactivity or timeout value. The user may then be required to be re-authenticated by the content control application (or some other authentication node in the media system) in order to access any additional media content.

A media guidance application implemented at least in part on the user equipment may already support various types of locking and parental control features. These locks may include program title locks 604, television ratings locks 606, movie ratings lock 608, channel locks 610, and website locks 612. Locks information area 602 may display detailed locks information depending on which lock is currently selected in display screen 600.

Title locks 604 may allow a supervisor to restrict access to content by title. Title locks 604 may be pre-programmed with titles typically found to be offensive to most parents. In addition, supervisors may add or remove titles to the list of title locks. A supervisor may toggle the lock status (e.g., "locked" or "unlocked") for any title appearing in the title locks list. In one embodiment, the supervisor may press the "OK" or "Lock" key on input device 108 (FIG. 1) to toggle the lock status for the title currently displayed in the title locks list. Once a title is locked, a user may not access the content corresponding to the title at any available location, including attached recording or storage devices. For example, locking the title "Desperate Housewives" would prohibit access to any episode of any season of the show.

TV ratings lock 606 allows a supervisor to lock television programs by rating. The user may toggle the lock status for each rating in TV ratings lock 606 by pressing an appropriate button on input device 108 (FIG. 1). In the U.S., the TV ratings of TV-Y, TV-Y7, TV-G, TV-PG, TV-14, and TV-MA may be included in TV ratings lock 606. In Canada, TV ratings may include C, C8, G, PG, 14+, and 18+. It is to be clearly understood, however, that any suitable ratings may be included in TV ratings lock 606. In addition, supervisors may create custom TV ratings and ratings categories. Media content, including media that is not associated with ratings by a ratings bureau (e.g., the MPAA) may be manually added to these custom ratings and ratings categories to further customize the operation of the ratings locks.

In addition to TV rating locks, movie rating locks may also be supported. The ratings in movie rating locks 608 may include, for example, the MPAA ratings of G, PG, PG-13, R, NC-17, and Adult. However, as with TV rating locks, custom movie ratings may be created by the supervisor. For example, movies that the supervisor feels are not appropriate for children under 15, may be added to a custom "PG-15" rating. This allows a supervisor greater flexibility and granularity than locking by widely-recognized ratings alone.

Content may also be locked by channel or device using channel locks 610. A supervisor may be presented with a list of all the available channels and devices accessible by the user equipment in channel locks 610. The supervisor may toggle the locked status for each device or channel by pressing an appropriate button on input device 108 (FIG. 1). In some embodiments, channel locks 610 includes selections for attached storage and recording devices. For example, "DVR1," "DVR2," and "GAME1" may correspond to a first digital video recorder, a second digital video recorder, and a first gaming console attached to the user equipment, respectively. If the supervisor locks these devices, the user will be unable to access media on these devices (or the user will be prompted for a valid user access code). In addition, the supervisor may select to lock "WEB," or all Internet content, via channel locks 610.

In some embodiments, websites and other Internet resources may be locked via website locks 612. A supervisor may manually input websites and/or domain names to be included in website locks 612 using any available input device, such as a keyboard or remote control. Once included in the website locks list, the supervisor may toggle the locked status for each website. For example, a supervisor may add "www.myspace.com" and "www.aol.com" to website locks 612. If the locked status for these website are set, the user may be unable to navigate to any webpage in the myspace.com or aol.com domains. Website locks 612 may be pre-programmed with a list of common websites and other Internet resources that are frequently objectionable by parents, if desired. In addition websites may be grouped by the user or the system operator. For example, all adult websites, all gambling websites, or all dating websites may be locked by category. The content control application may retrieve updated lists of potentially objectionable websites belonging to these pre-defined categories regularly from the systems operator, content source 130 (FIG. 1), data source 142 (FIG. 1), or third-party source 120 (FIG. 1), as desired.

The parental control locks depicted in FIG. 6 represent some of the most common parental control locks. Other locks not specifically described may also be used without departing from the spirit of the invention. For example, on-demand or pay-per-view locks may restrict access to these services. As another example, in some embodiments all of the aforementioned locks may be associated with a start date/time and expiration date/time combination. Locks may be individually enforced for pre-selected time windows for specific users or for all users, if desired. For example, a supervisor may create a new lock prohibiting the youngest child in the household from accessing pay-per-view content from 10:00 PM to 4:00 AM (presumably when adult material is available). As another example, a supervisor may create a new lock restricting all users from watching R-rated movies on school nights (Monday through Friday). These example are merely illustrative, and many other parental control locks may be used.

Figure 7:
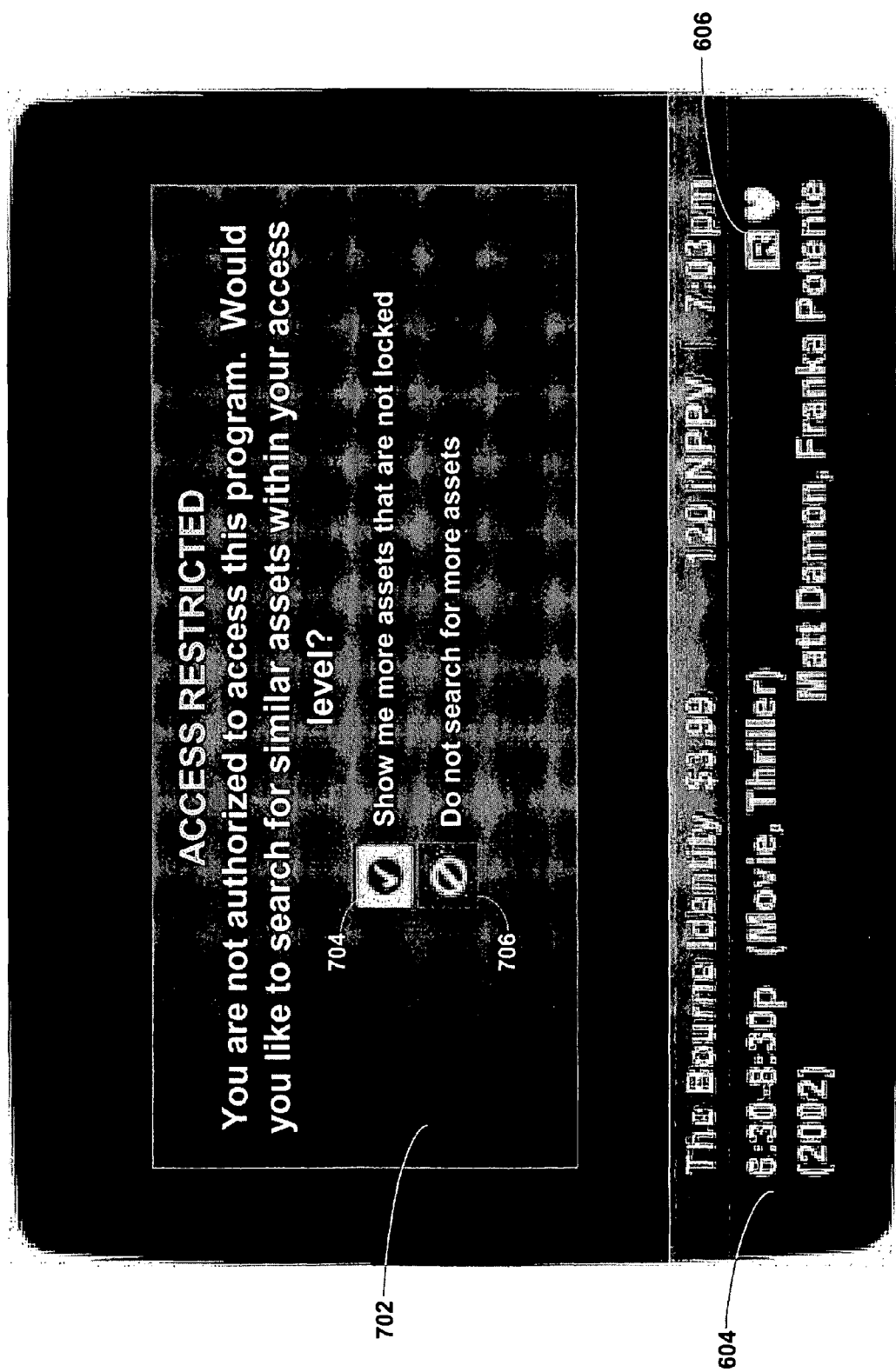
FIG. 7 shows an illustrative locked parental control display screen with a similar asset search prompt in accordance with one embodiment of the present invention.

FIG. 7 shows illustrative restricted access display screen 700 in accordance with one embodiment of the invention. Prompt 702 may be displayed, for example, when the user attempts to access program 604 with rating 606 that exceeds the user's parental control settings. Prompt 702 may also be displayed if program 604 violates any other parental lock (e.g., a title lock). Prompt 702 may inform the user of the blocked access and, in some embodiments, the reason(s) why access has been restricted. For example, the type of parental lock that program 604 has exceeded or violated may be displayed to the user in prompt 702.

In some embodiments, after being presented with prompt 702, the user can select to perform a media search for permitted assets. In the example of FIG. 7, prompt 702 includes search button 704 and cancel button 706. If the user wishes to initiate an asset search, the user may select search button 704 using any available input device. If the user wishes to close prompt 702 without searching for media, the user may select cancel button 706. Prompt 702 may also be incorporated into prompt 502 (FIG. 5) if desired. By incorporating the two prompts into a single prompt, the user is given the opportunity to either enter a parental control access code or alternatively search for media similar to the requested media.

After the user selects search button 704, a comprehensive search of all available media accessible by the user equipment may be performed. The media searched may include, for example, broadcast television programming, on-demand programming, digital audio selections, and Internet resources (such as websites). In some embodiments, attached storage devices (e.g., digital video recorders and hard disks) and gaming consoles are also searched for media. The results of the search may be limited to assets permitted by the current user's parental control settings. For example, if parental movie rating locks are in effect for adult and R-rated movies, the search may be limited to movies rated G, PG, and PG-13. As described in more detail with regard to FIGS. 10-13, the search results may also be limited to media similar to requested program 604, which was locked by the user's parental control settings.

Figure 8:
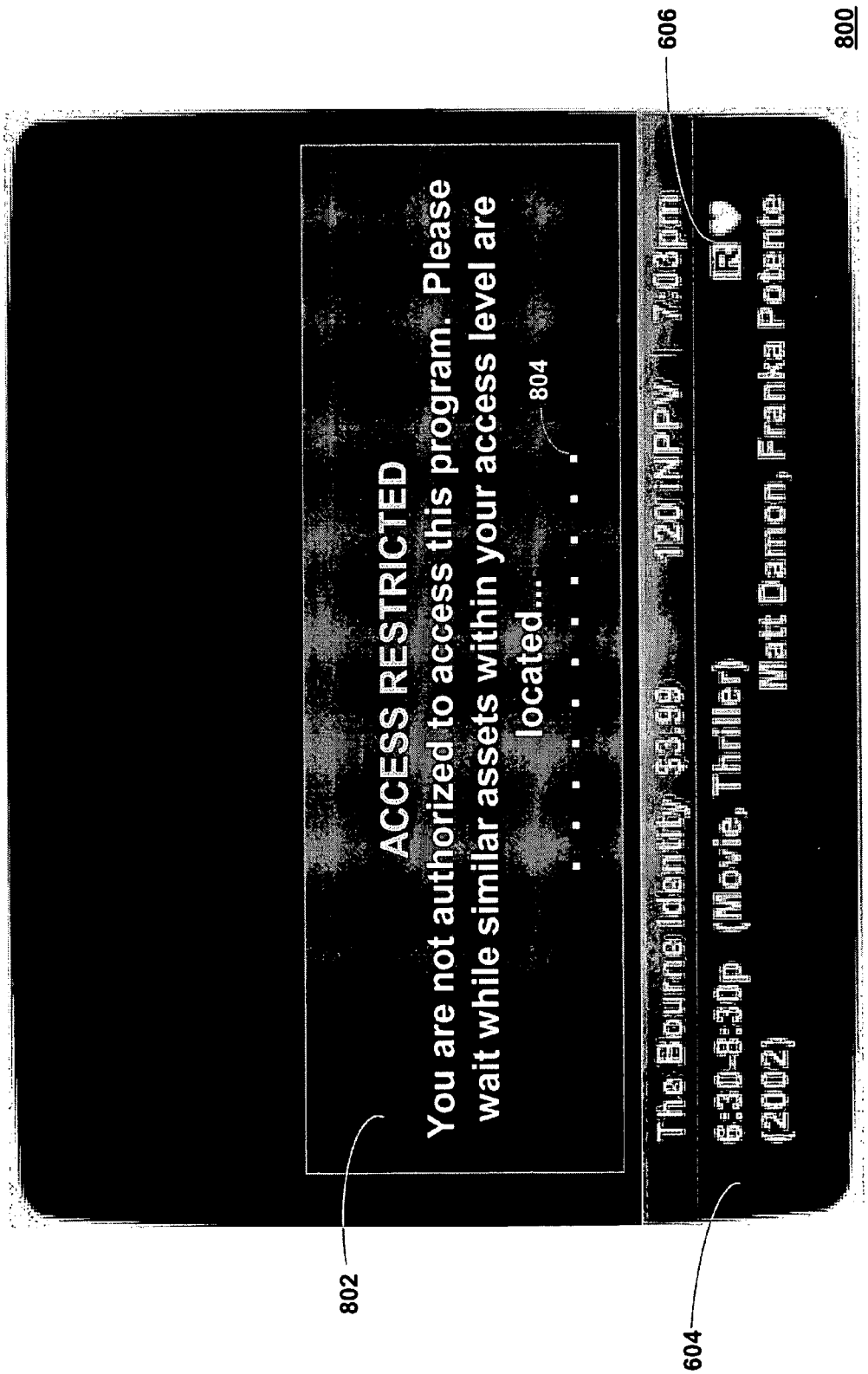
FIG. 8 shows an illustrative blocked parental control display screen with automatic search notification in accordance with one embodiment of the present invention.

As depicted in FIG. 8, in some embodiments a media search is performed automatically after a user attempts to access content that is not permitted by the user's parental control settings. For example, display screen 800 may include prompt 802. Prompt 802 may be displayed to the user when the user attempts to access program 604 with rating 606. Program 604 may exceed one or more parental locks, such as a rating lock. Prompt 802 may inform the user that a search is being performed on behalf of the user for similar assets permitted by the user's current parental control settings. In some embodiments, prompt 802 includes progress indicator 804, which reflects the progress of the media search.

Figure 9:
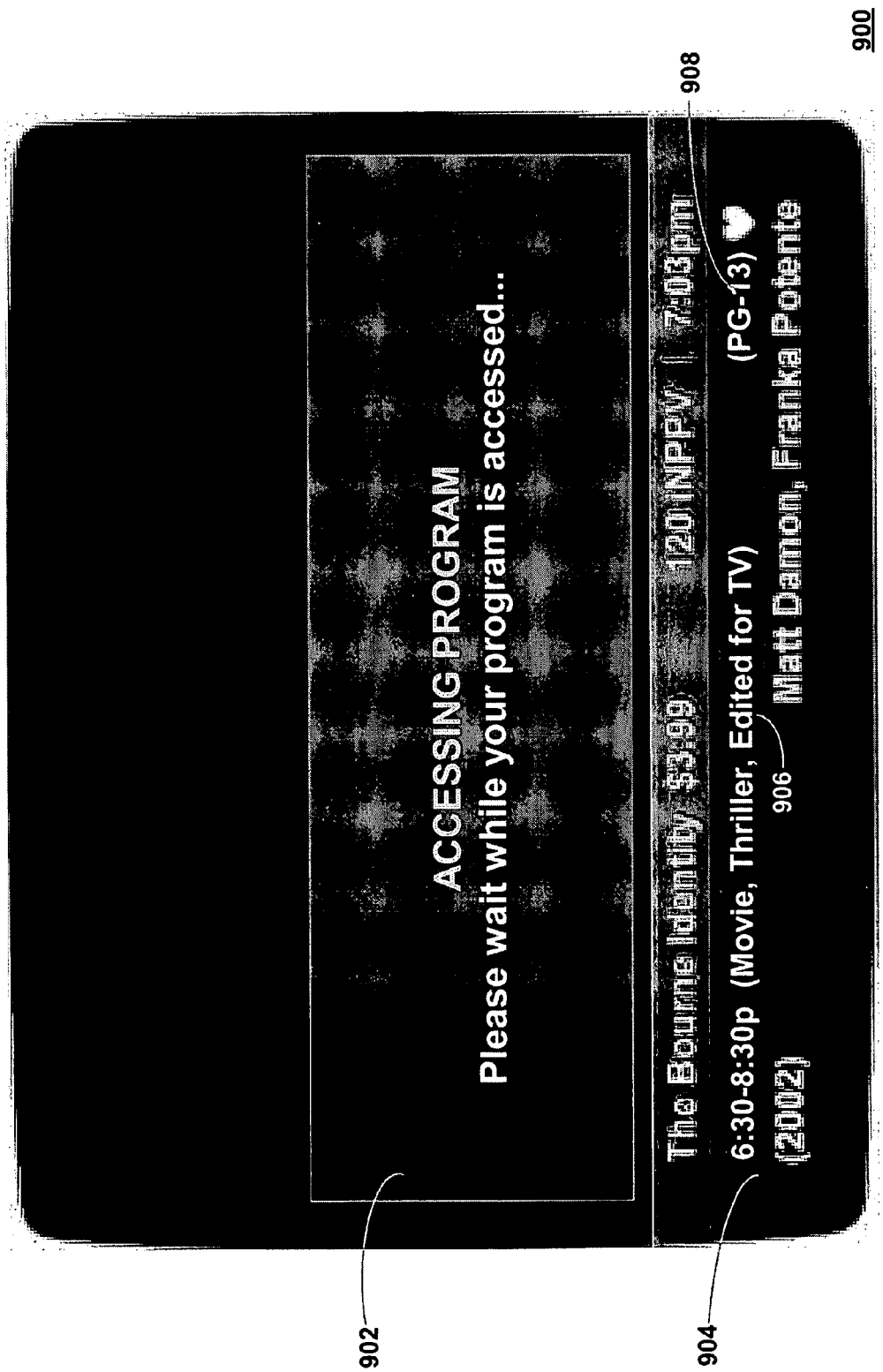
FIG. 9 shows an illustrative parental control edited content access display screen in accordance with one embodiment of the present invention.

FIG. 9 shows illustrative edited content display screen 900. In some embodiments, the user equipment may have access to more than one version of a particular program or asset. For example, one version of a particular program may be unedited, while another version may be edited or censored for television. The edited or censored version may be associated with a different rating. For instance, in the example of FIG. 9, an edited version of program 904, "The Bourne Identity," was located and accessed in lieu of the unedited version. This edited version now has a PG-13 rating, as illustrated by rating 908. This version of the asset has been edited for television, as indicated by comment 906. The user may be automatically presented with the appropriate version of a requested asset that is permitted by the user's parental control settings, if one is available. If more than one version is available and permitted (e.g., a PG-rated version and a PG-13-rated version), then in some embodiments the user may select to view either one of the permitted versions. In other embodiments, the user equipment defaults to present the version with the highest rating permitted by the user's parental control settings.

As another example, a user who requests an explicit song may be automatically presented with a censored version of the song without the explicit lyrics. Comment 906 may indicate that the version being presented to the user is not the original version requested, but rather an edited version that is permitted by the user's parental control settings.

Instead of accessing pre-edited versions of assets, the content control application may also automatically censor content on-the-fly. For example, closed captioning data may be analyzed to dynamically remove or replace explicit words or lyrics. The censored media may then be assigned a new rating, if appropriate. For example, an R-rated feature movie edited for strong language may be assigned a new PG-13 rating. The new rating of the censored media may be automatically generated based on a number of factors, including the number of removed or replaced explicit words, the frequency and/or distribution of explicit words remaining in the media, or any other suitable criteria.

Figure 10:
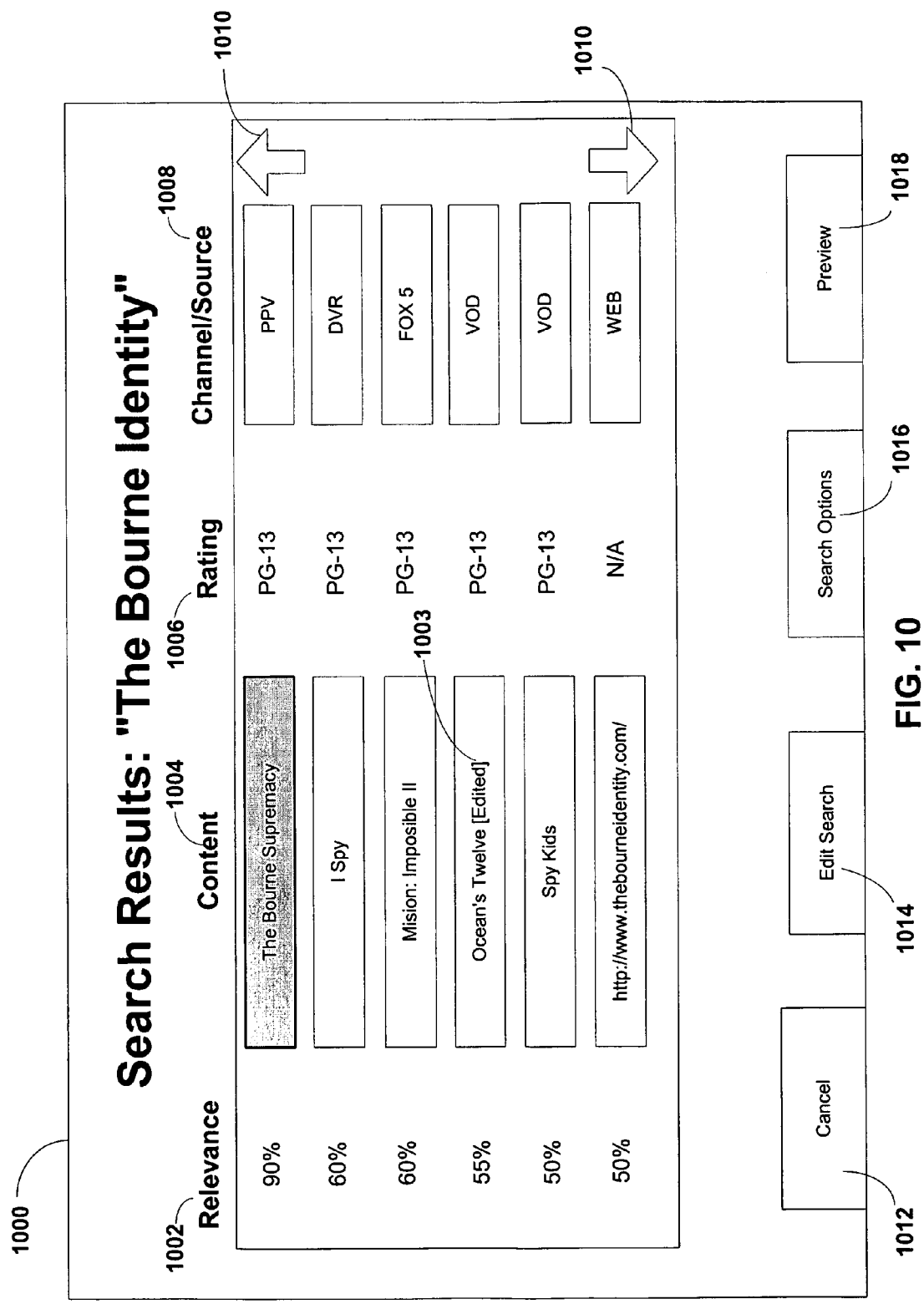
FIG. 10 shows an illustrative parental control search results display screen in accordance with one embodiment of the present invention.

FIG. 10 shows an illustrative search results display screen 1000. Display screen 1000 may be displayed to the user after selecting button 704 (FIG. 7), after prompt 802 (FIG. 8), or other convenient times. For example, a user may press a "Search" key on input device 108 (FIG. 1) while a program is selected in a media guidance application to initiate a search for media permitted by the user's parental control settings similar to a selected program. In the example of FIG. 10, the user attempted to watch the movie "The Bourne Identity," but was prevented from watching the movie due to parental control settings in effect on the user equipment. As a result, a search was performed to locate assets accessible by the user equipment similar to the movie "The Bourne Identity."

Is some embodiments, search results display screen 1000 may include relevance column 1002, content column 1004, rating column 1006, and channel/source column 1008. The results in search results display screen 1000 may be sorted by any suitable criteria, including, for example, by relevance, content, rating, or channel/source. In the example of FIG. 10, search results are sorted by relevance (highest relevance first). As described in more detail in patent application Ser. No. 11/324,147, filed Dec. 29, 2005, which is hereby incorporated by reference herein in its entirety, relevance may be determined by calculating the "distance" between the searched media and the reference media. This distance represents the similarity between the media and the reference. The content control application may calculate the distance between the searched media and the reference media based on calculations in one or more dimensions. Such dimensions may represent attributes of the media such as, for example, genres, actors, directors, language, ratings, and program descriptions. The number shown in relevance column 1002 may be indicative of the average distance between all the available dimensions, or only the dimensions specifically selected by the user in display screen 1200 (FIG. 12), which is described in more detail below.

Display screen 1000, in addition to listing search results similar to the reference program, may also display promotional advertisements or links to other media content that are not necessarily part of the search results. For example, new on-demand and pay-per-view releases may be listed at the top of the search results in an effort to promote their purchase and/or viewing. As another example, search results display screen 1000 may include one or more advertisement windows or panels, promoting various products and services or media accessible by the user equipment. In some embodiments, the advertisements and other promotional material are related to the search results. For example, a search result screen containing digital audio selections may have an advertisement for (or link to a website to purchase) the actual audio album. The user equipment may automatically supply user billing and address information to the vendor if available on the user equipment (e.g., if this information is stored as a user preference) or on the media system (e.g., if this information is stored in database 122 of FIG. 1).

The user may navigate through the search results displayed in display screen 1000 using the up and down arrows on a remote control (or other input device). The user may also select arrows 1010 to scroll up and down through the search results. As the user scrolls through the results, a video pane or window (not shown) may display related media or program information to the user. In some embodiments, this video pane or window may by synchronized with the currently selected asset in the search results. As a user selects or highlights different assets, the video or picture displayed in the pane or window may change accordingly. In other embodiments, the video pane or window may present advertisements or other content not necessarily related to the assets in the search results. In these embodiments, the pane or window may or may not be synchronized with the currently selected asset in the list of search results. To access or present assets displayed in display screen 1000, the user may select any content name in column 1004. Because the search results are all permitted by the user's parental control settings, the user may freely select any program in the search results list to automatically tune to that program without fear of receiving a locked display screen.

The content listed in content column 1004 may include any assets accessible by the user equipment. These assets include, for example, on-demand media, broadcast television media, digital audio, recorded media, and Internet resources. In some embodiments, content column 1004 may additionally or alternatively include assets not currently available or accessible by the user equipment, but that will be accessible or available in the future. For example, broadcast programs that are scheduled to be aired and/or on-demand content that is scheduled to be released may be listed in the search results. If the asset is not currently available or accessible by the user equipment, the estimated or scheduled time that the asset will be available may also be displayed to the user in display screen 1000. Users may be given the opportunity to automatically record these assets or set a reminder when these assets are available or accessible.

In addition, the content may include edited content, such as censored music selections and movies edited for television. Edited content may be denoted with edited flag 1003. In the example of FIG. 10, the user's parental control settings prohibit R-rated media, like the feature movie "The Bourne Identity." Display screen 1000 may list assets similar to "The Bourne Identity" that are permitted by the user's parental control settings. For example, "The Bourne Supremacy," the sequel to "The Bourne Identity," may be displayed to the user in display screen 1000. This content has an MPAA rating of PG-13, and is thus not locked by the parental rating lock. The rating for this program may be displayed in rating column 1006, and the source may be listed in channel/source column 1008. The user may tune directly to this asset from search results display screen 1000 by selecting the content name in column 1004.

If the user would rather watch a preview of an asset listed in display screen 1000, the user may select preview button 1018. After selecting preview button 1018, the user may be presented with more information about the media, including a text summary or video preview of the asset. After watching the preview, the user may then decide whether to access the media. To edit the search terms used for the current search, the user may select edit search button 1014. After selecting edit search button 1014, display screen 1200 (FIG. 12) may be presented to the user. To edit the default order that the search results are presented in display screen 1000, the user may select search options button 1016. After selecting search options button 1016, the user may be presented with display screen 1300 (FIG. 13), which is described in more detail below. To exit display screen 1000, the user may select cancel button 1012.

A user may also initiate a search based on a digital music selection. For example, display screen 1100 displays search results for a music selection containing explicit lyrics. Music with explicit lyrics may be prohibited by the user's parental control settings. Therefore, the content control application may have performed a search on behalf of the user for similar assets permitted by the user's parental controls.

As in search results display screen 1000 (FIG. 10), display screen 1100 may include relevance column 1102, content column 1104, rating column 1106, and channel/source column 1108. A user may tune directly to any asset listed in content column 1104 by selecting the name of the asset. Icon 1103 may be displayed next to the content name to indicate that this selection is a digital music selection.

Content column 1104 contains several digital music selections as well as other media content related to the reference music selection. An edited version of the reference song without explicit lyrics was located in the user's audio library. Because this song is identical to the requested song (but without explicit lyrics), this search result was given a 100% relevance rating and is displayed first according to one criteria. Channel/source column 1108 indicates that this selection was found in the user's audio library. The user's audio library may include a compilation of digital music and other media stored locally at the user equipment (e.g., on an attached recording device or MP3 player) or at a network location (e.g., content source 130 or third-party source 120, both of FIG. 1). The user may select any content name in column 1104 to access the asset directly from search results display screen 1100. To view more search results, the user may select arrows 1110.

To edit the search terms used for the current search, the user may select edit search button 1114. After selecting edit search button 1114, display screen 1200 (FIG. 12) may be presented to the user. To edit the default order that the search results are presented in display screen 1100, the user may select search options button 1116. After selecting search options button 1116, the user may be presented with display screen 1300 (FIG. 13). To listen to a digital preview of an audio selection, the user may select preview button 1118. In addition to hearing a sampling of the audio selection, the music video (if available) may be presented to the user for preview. After the user has previewed a selection, the user may then decide whether to access the media. To exit display screen 1100, the user may select cancel button 1112.

Figure 12:
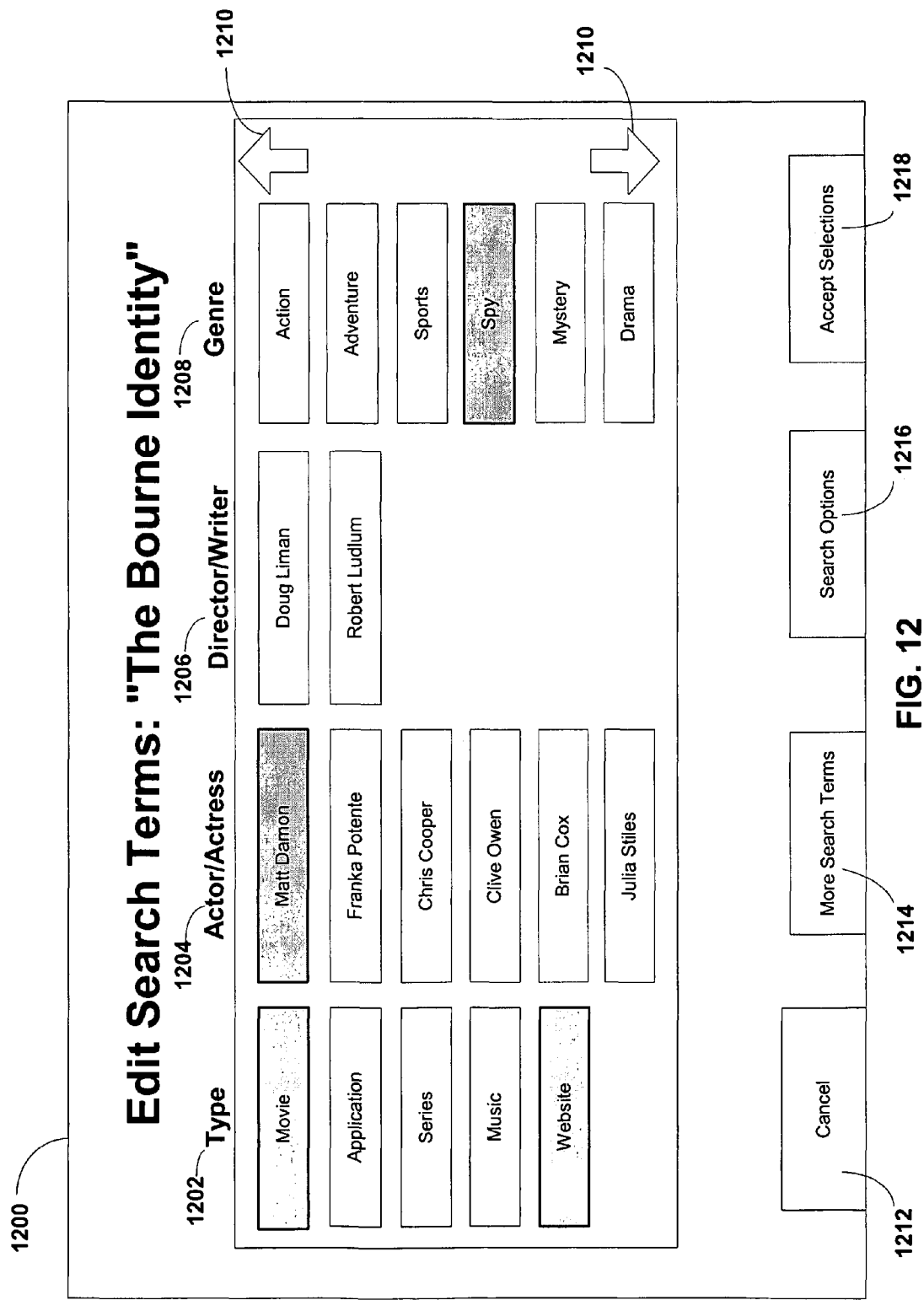
FIG. 12 shows an illustrative search terms display screen in accordance with one embodiment of the present invention.
Figure 13:
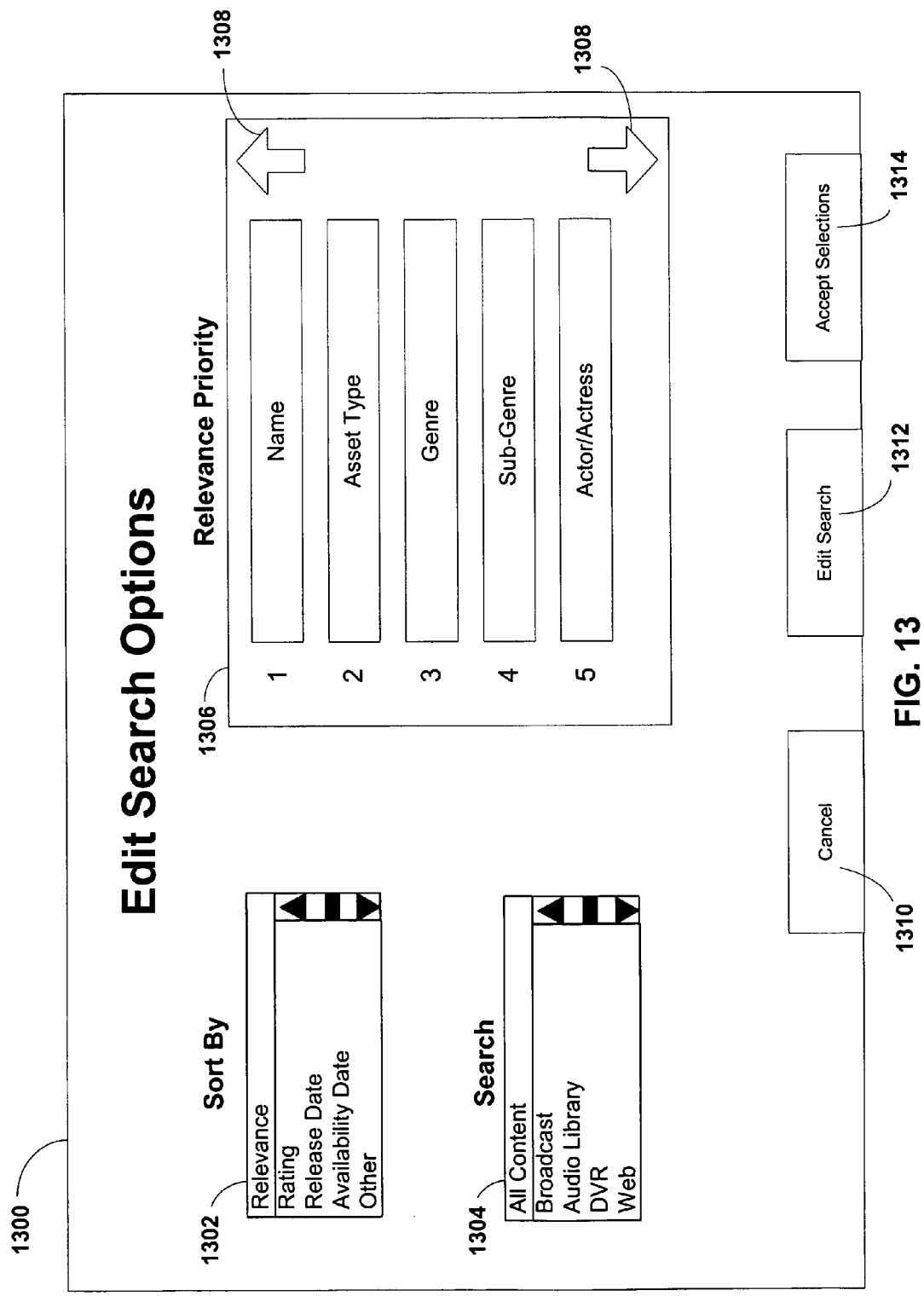
FIG. 13 shows an illustrative search options display screen in accordance with one embodiment of the present invention.

FIG. 12 shows illustrative search terms display screen 1200. A user may edit the search terms and dimensions used to calculate media relevancy, or similarity, to the reference media. For example, search terms may include the type of asset, the actors/actresses appearing in the asset, the director or writer of the asset, the asset's genre, or any other media descriptor. The content control application may connect to a data source (e.g., data source 142 of FIG. 1) to retrieve the asset information used to populate search terms display screen 1200. Certain search terms that relate to the reference media (e.g., the movie "The Bourne Identity" in the example of FIG. 12) may be automatically pre-selected by the content control application. In some embodiments, the pre-selected search terms may constitute the default search criteria for the reference media.

Search terms may be pre-selected for other reasons as well, including, for example, popularity of the search term among the current user or all users of the system, as well as for promotional purposes. For example, if a new Matt Damon movie has been recently released as a pay-per-view or on-demand selection, Matt Damon may be pre-selected as a search term for the user's search criteria. In this way, the new release will be displayed in the search results presented to the user.

In the example of FIG. 12, search terms display screen 1200 includes type column 1202, actor/actress column 1204, director/writer column 1206, and genre column 1208. The user may toggle one or more of the entries in columns 1202, 1204, 1206, and 1208 to change the search string used by the content control application when searching for available assets. To view more entries in columns 1202, 1204, 1206, or 1208, the user may select arrows 1210 to scroll up or down through the search term list. Illustrative media types listed in type column 1202 include movies, series, applications, websites, and music. Other media types may be used, if desired. In the example of FIG. 12, the content control application is searching for movies and websites, media with Matt Damon as an actor, and movies classified in the spy genre. Users may tailor search terms display screen 1200 to be more or less restrictive, if desired.

To add additional search terms or remove existing search terms from the search criteria, the user may select more search terms button 1214. Other search terms that may be included in the search criteria may include, for example, rating, language, sub-genre, topic, program description, or any other suitable attribute. To edit the default order that the search results are presented, the user may select search options button 1216. After selecting search options button 1216, the user may be presented with display screen 1300 (FIG. 13). To exit display screen 1200, the user may select cancel button 1212. To accept the current selections in display screen 1200, the user may select accept button 1218. After selecting accept button 1218, the user may be presented with a new search results display screen, such as display screen 1000 of FIG. 10.

Search results (such as the search results displayed in display screen 1000 of FIG. 10 and display screen 1100 of FIG. 11) may be sorted or ordered in any convenient manner. To establish a default sort order and other search options, the user may be presented with options display screen 1300 of FIG. 13. This display screen may be presented after the user selects search options buttons 1016 (FIG. 10), 1116 (FIG. 11) or 1216 (FIG. 12).

Options display screen 1300 may include several options to customize the operation of the parental control asset search. Some of these options may be user-configurable, while other options may only be configurable by an authorized supervisor with a parental control access code. If an authorized supervisor is editing the options in display screen 1300, the options may be enforced on all users of the system or a selected sub-group. In addition, certain users may be granted access to alter the options in display screen 1300, while other users may not have access. If a user is unauthorized to modify a search option, that search option may be grayed out or disabled in search screen 1300.

Search screen 1300 may include sort by choice 1302, content search choice 1304, and relevance priority list 1306. In sort by choice 1302, a user may select the default search result sort column. In some embodiments, the user is also given the option to sort the selection in sort by choice 1302 "high-to-low" or "low-to-high." For example, if sort by rating is selected in sort by choice 1302, a user may additionally choose to sort from most restricted rating (e.g., the MPAA rating of "R" or "Adult") to the least restrictive rating (e.g., the MPAA rating of G), or vice versa.

In content search choice 1304, the user may select what assets to search. For example, the user may specify that all accessible assets should be searched by selecting "All Rated Content." Alternatively, the user may select to narrow the search to just broadcast media, digital assets in the user's audio library, recorded assets (e.g., media located on an attached digital video recorder or gaming system), or Internet assets (e.g., webpages, and chatrooms). A user may select more than one entry in content search choice 1304 to search more than one category of assets.

In relevance priority list 1306 the user may set the rank of various asset attributes or dimensions. The rank of the attributes in priority list 1306 may be used in determining the relevance or similarity between the located assets and the requested asset. The values for relevance displayed in columns 1002 (FIG. 10) and 1102 (FIG. 11) associated with the search results may depend on the user's settings in relevance priority list 1306. For example, the user may care more about matching similar asset names and asset types than matching similar actors/actresses. If this is the case, the user could move "Name" and "Asset Type" closer to the top of the priority list. In this way, the content control application can give higher priority to these attributes (and hence a higher weight in the distance calculation). For example, the similarity or relevance between two assets may be determined by calculating the weighted average of all the selected comparison dimensions. In some embodiments, this weighted average value may be used as the distance between the two assets. The value applied as the weight for each dimension in the weighted average may be directly proportional to the rank in relevance priority list 1306. To scroll up or down in relevance priority list 1306, the user may select arrows 1308 or select cursor keys on an input device.

To exit search options display screen 1300 and return to the previous screen, the user may select cancel button 1310. To edit the search terms used for the current search, the user may select edit search button 1312. After selecting edit search button 1312, display screen 1200 (FIG. 12) may be presented to the user. To confirm the selections in search options display screen 1300, the user may select accept button 1314.

Figure 14:
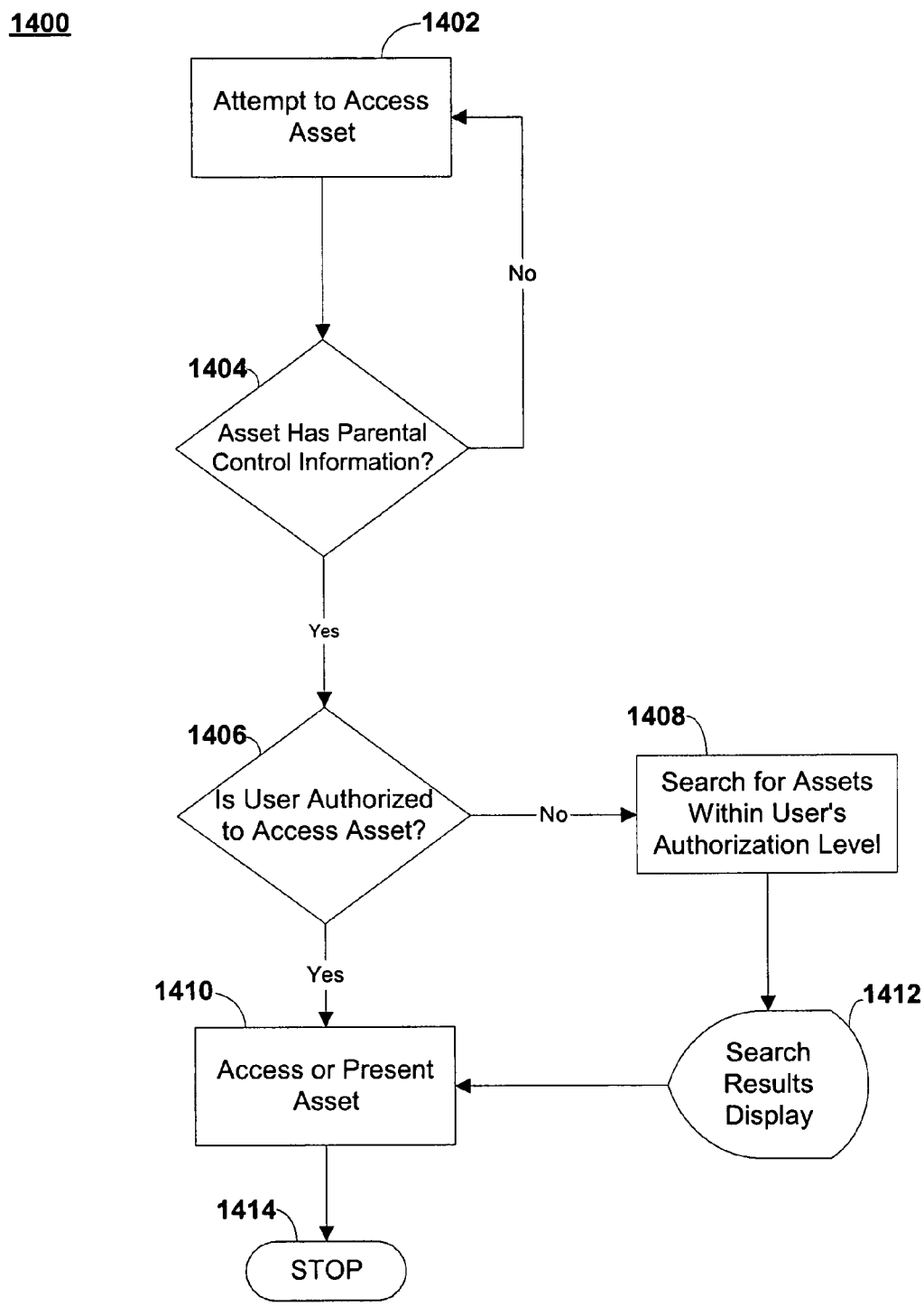
FIG. 14 is a flow chart depicting an illustrative process for automatically presenting parental control search results to a user in accordance with one embodiment of the present invention.

FIG. 14 shows illustrative process 1400 for automatically searching for assets permitted by a user's parental control settings. At step 1402 the user may attempt to access an asset. This asset could include, for example, a website, a broadcast television program, an interactive application (e.g., an interactive game), recorded content, on-demand content, news, digital music, or any other content capable of being displayed, presented to, recorded, or interacted with, using the user equipment. At decision 1404 the content control application may determine if the asset the user is attempting to access at step 1402 is associated with parental control information. Parental control information could include, for example, an MPAA rating (for motion pictures), a TV rating (for broadcast and recorded television programs), an explicit lyrics tag (for digital music), or any other information used by one of the locks listed in locks setup display screen 600 of FIG. 6. For example, the asset title may be used by a parental control title lock that has been created in locks setup display screen 600 of FIG. 6. The content control application may determine if the asset the user is attempting to access is associated with parental control information by, for example, analyzing or the requesting parental control data (if any exists) relating to the asset from data sources 140, content source 130, or third-party source 120 (all of FIG. 1). In some embodiments, parental control information is automatically delivered to the content control application upon a user request for an asset. In other embodiments, the content control application requests parental control information from any available data or content source in the media system upon a user request for an asset.

In some embodiments, if an asset does not contain parental control or content rating information, the user returns to step 1402 to select another asset. In other less restrictive embodiments, the supervisor may allow assets without parental control information to be presented on the user equipment as long as the asset does not violate another parental control setting (e.g., a channel lock).

If the asset has parental control information associated with it, the content control application determines if the current user is authorized to access the asset at decision 1406. The user may be authorized to access an asset if accessing the asset would not violate any parental control locks or other parental control settings in force on the user equipment. For example, the content control application may access parental control settings and locks stored in a database in memory 112 (FIG. 1) and compare the asset's parental control information to these locks and settings. If the asset's parental control information conflicts with the user's parental control settings or locks, the user may not be authorized to access the asset. Otherwise, the user may be authorized to access the asset.

If the user is authorized the asset, the content control application accesses or presents the asset at step 1410, and illustrative process 1400 may stop at step 1414. If the content control application determines that the user is not authorized to access the asset at decision 1406, the content control application may automatically recommend or search for similar assets permitted by the user's parental control settings at step 1408. For example, the content control application may access media guidance application data, content source 130, and/or third-party source 120 to perform the search. During step 1408, prompt 802 of display screen 800 (FIG. 8) may be presented to the user.

After the asset search is complete, the results of the search may be displayed to the user in display 1412. This display may correspond to display screen 1000 (FIG. 10) or display screen 1100 (FIG. 11). After the user selects an asset in display 1412, the content control application may automatically access or present the selected asset at step 1410. The illustrative process may stop at step 1414.

In practice, one or more steps shown in process 1400 may be combined with other steps, performed in any suitable order, performed in parallel—e.g., simultaneously or substantially simultaneously—or deleted. For example, in some less restrictive systems decision 1404 may be deleted so that assets with or without parental control information may be accessed by the user.

Figure 15:
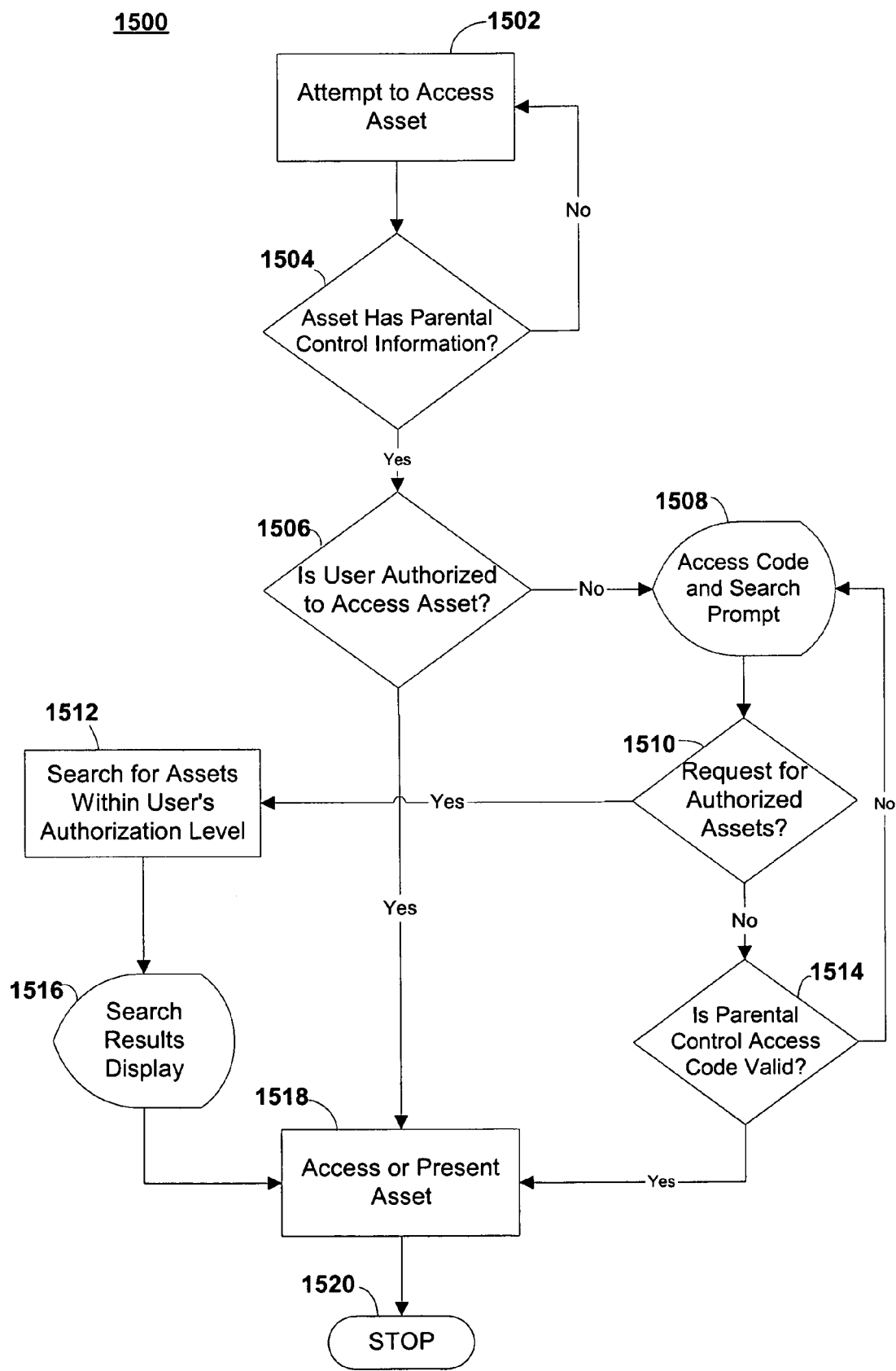
FIG. 15 is a flow chart depicting an illustrative process for presenting a parental control access code prompt with parental control search option to a user in accordance with one embodiment of the present invention.

FIG. 15 shows illustrative process 1500 for prompting the user to search for assets permitted by the user's parental control settings. At step 1502 the user may attempt to access an asset. At decision 1504 the content control application may determine if the asset is associated with parental control information. The content control application may determine if the asset the user is attempting to access is associated with parental control information by, for example, analyzing or the requesting parental control data (if any exists) relating to the asset from data sources 140, content source 130, or third-party source 120 (all of FIG. 1). In some embodiments, parental control information is automatically delivered to the content control application upon a user request for an asset. In other embodiments, the content control application requests parental control information from any available data or content source in the media system upon a user request for an asset.

In some embodiments, if the asset is not associated with parental control or content rating information the user returns to step 1502. In other embodiments, the user is advanced to decision 1506 regardless of whether the asset is associated with parental control information. At decision 1506, the content control application may determine if the current user is authorized to access the asset. The user may be authorized to access an asset if accessing the asset would not violate any parental control locks or other parental control settings in force on the user equipment. For example, the content control application may access parental control settings and locks stored in a database in memory 112 (FIG. 1) and compare the asset's parental control information to these locks and settings. If the asset's parental control information conflicts with the user's parental control settings or locks, the user may not be authorized to access the asset. Otherwise, the user may be authorized to access the asset. If the user is authorized to access the requested asset, the content control application accesses or presents the asset at step 1518. Otherwise, the user may be presented with a parental control access code prompt at display 1508. In some embodiments, display 1508 may also include an option to search for authorized assets. Examples of display 1508 may include, for example, prompt 602 (FIG. 6), prompt 702 (FIG. 7), or some combination of the two prompts. If the user requests a search for authorized assets at decision 1510, the search may be performed at step 1512. For example, the content control application may access media guidance application data, content source 130, and/or third-party source 120 to perform the search. Search results may then be displayed in display 1516. Display 1516 may correspond to search results display screens 1000 (FIG. 10) or 1100 (FIG. 11). After the user selects an asset from display 1516, the user may be tuned directly to the selected asset at step 1518.

If the user does not choose to perform a search for assets permitted by the user's parental control settings, the content control application may determine if the user has entered a valid parental control access code at decision 1514. For example, the inputted code may be compared to a list of authorized parental control access codes stored on the user equipment (e.g., in memory 112 of FIG. 1) or on a network location (e.g., on third-party source 120 of FIG. 1). If the access code is not valid, the user may be returned to display 1508. If the access code is valid, the user may be tuned directly to the asset that the user attempted to access at step 1502. The user is tuned to the asset at step 1518, and the illustrative process may stop at step 1520.

In practice, one or more steps shown in process 1500 may be combined with other steps, performed in any suitable order, performed in parallel—e.g., simultaneously or substantially simultaneously—or deleted. For example, display 1508 be separated into two distinct displays. One display may prompt for a parental access code and proceed to decision 1514, while another display may prompt to search for authorized assets and proceed to decision 1510.

Figure 16:
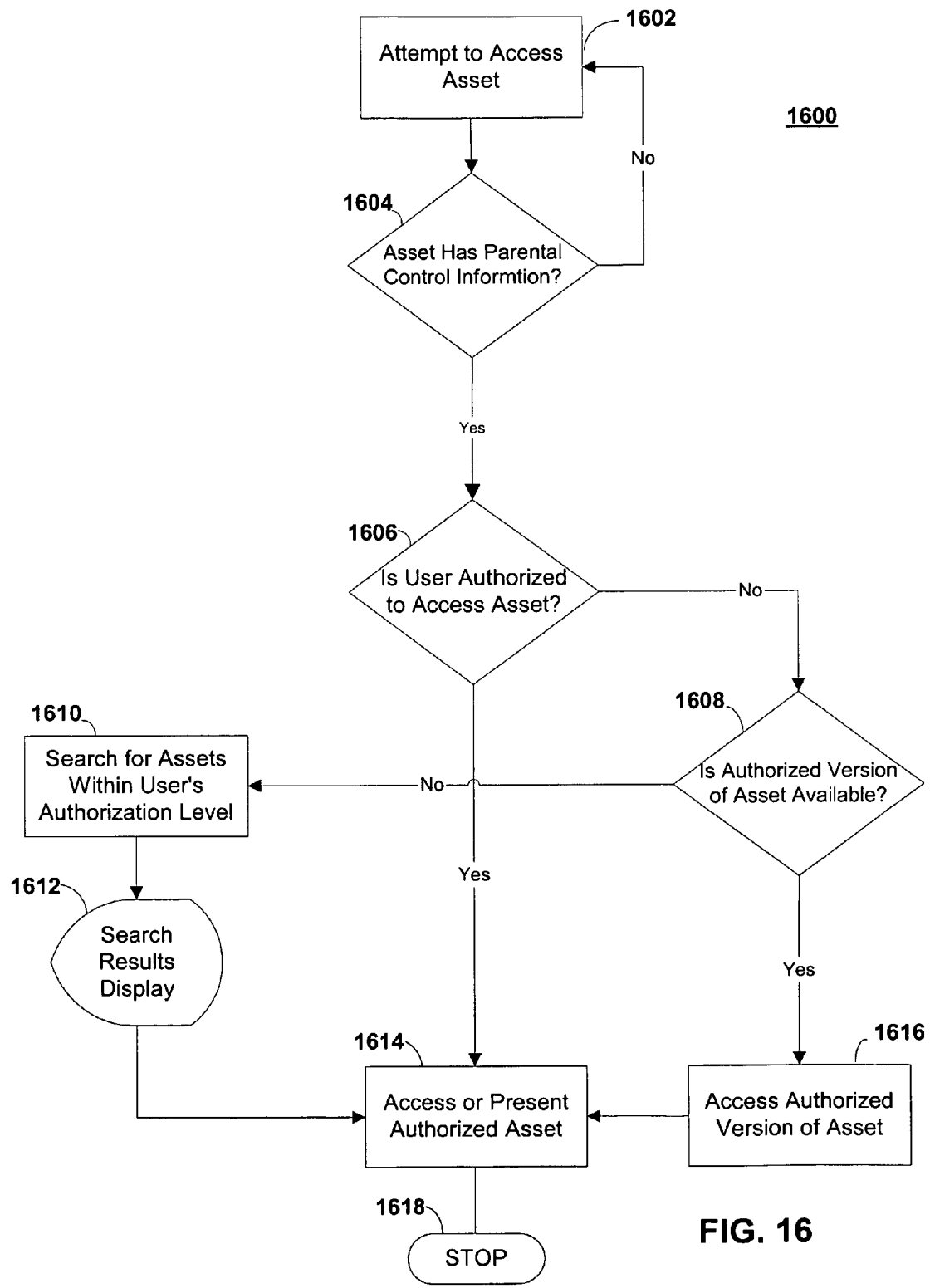
FIG. 16 is a flow chart depicting an illustrative process for automatically presenting an edited version of locked media content to a user in accordance with one embodiment of the present invention.

FIG. 16 shows an illustrative process for automatically accessing an edited or censored version of an asset. The user may attempt to access an asset at step 1602. At decision 1604 the content control application may determine if the asset is associated with parental control information. The content control application may determine if the asset the user is attempting to access is associated with parental control information by, for example, analyzing or the requesting parental control data (if any exists) relating to the asset from data sources 140, content source 130, or third-party source 120 (all of FIG. 1). In some embodiments, parental control information is automatically delivered to the content control application upon a user request for an asset. In other embodiments, the content control application requests parental control information from any available data or content source in the media system upon a user request for an asset.

In some embodiments, if the asset is not associated with parental control or content rating information the user may return to step 1602. In other embodiments, the user is advanced to decision 1606 regardless of whether the asset is associated with parental control information.

At decision 1606 the content control application may determine if the user is authorized to access the asset (e.g., accessing the asset would not violate parental control settings or locks in force on the user equipment). For example, the content control application may access parental control settings and locks stored in a database in memory 112 (FIG. 1) and compare the asset's parental control information to these locks and settings. If the user is authorized to access the asset, the content control application may access or present the asset at step 1614. If the content control application determines that the user is not authorized to access the asset, the content control application may search for another version of the same asset that is authorized. For example, if the user is attempting to access a digital music selection with explicit lyrics at step 1602, and explicit music selections are not permitted by the user's parental control settings, the content control application may determine if a non-explicit version of the same music selection exists and is accessible. As another example, if the user is attempting to watch an R-rated movie, and R-rated movies are not permitted by a parental control movie rating lock, the control application may determine if an edited version of the same movie exists and is accessible. This edited version of the movie may be associated with a rating that is permitted by the user's parental control settings.

If the content control application determines that an authorized version is available at decision 1608, the authorized version may be accessed at step 1616, and the user may be directly tuned to the authorized version of the asset at step 1614. While the asset is being accessed a display screen, such as display screen 900 (FIG. 9), may be presented to the user. If an authorized version does not exist or is not available, the content control application may search for authorized assets at step 1610 and display any results to the user in display 1612. Display 1612 may correspond to search results display screen 1000 (FIG. 10) of display screen 1100 (FIG. 11). The user may tune directly to any asset listed in display 1612 at step 1614. The illustrative process may stop at step 1618.

In practice, one or more steps shown in process 1600 may be combined with other steps, performed in any suitable order, performed in parallel—e.g., simultaneously or substantially simultaneously—or deleted. For example, step 1610 and display 1612 may be deleted. If the content control application determines that an authorized version of the requested asset is not available a decision 1608, the user may be simply informed that an authorized version does not exist. Alternatively or additionally, the user may be prompted for a parental control access code, or the user may be given another opportunity to select an authorized asset at step 1602.

It will be noted that all of the features described above in connection with the content control application and the parental control asset searches of the invention may be implemented on various user equipment, including, for example, television receivers, set-top boxes, computers, gaming devices, audio players, and recording devices. In addition, although the terms "media," "content," and "assets" are used interchangeably, all these terms refer to any suitable media capable of being displayed, presented to, recorded, or interacted with, using user equipment. This media may include movies, television programs, music, news, interactive applications (e.g., interactive games), and Internet resources (e.g., website, newsgroups, chatrooms).

The above described embodiments of the invention are presented for purposes of illustration and not of limitation, and the present invention is limited only by the claims which follow.

What is claimed is:

1. A method for searching for assets that are permitted by parental controls, the method comprising:

receiving, with a user input device, user input to access a requested asset, wherein the requested asset is selected from the group consisting of a video asset, a music asset, an image asset and a text asset;

determining, using control circuitry, whether accessing the requested asset violates parental controls; and at the time the user input to access the requested asset is received and in response to determining that accessing the requested asset violates parental controls:

presenting, on a display device, a prompt, wherein said prompt comprises:

an indication of a type of parental control exceeded or violated by the requested asset;

an option to enter a parental control access code; and an option to simultaneously search a local source and a remote source for other available assets that do not violate parental controls.

2. The method of claim 1 further comprising:
presenting a search results display listing the available assets that do not violate parental controls; and
accessing at least one of the available assets directly from the search results display.

3. The method of claim 2, wherein the search results display includes an edited version of the requested asset and at least one other asset.

4. The method of claim 1 further comprising:
receiving parental control access code input; and
determining whether the received parental control access code input is valid.

5. The method of claim 4 further comprising:
accessing the requested asset, in response to determining that the received parental control access code input is valid.

6. The method of claim 4 wherein determining whether the received parental control access code input is valid comprises determining if the parental access code is expired.

7. The method of claim 6 wherein determining if the parental access code is expired comprises determining if a usage criteria associated with the parental access code has been met.

8. The method of claim 7 wherein the usage criteria comprises a predetermined amount of content viewing associated with a particular rating.

9. The method of claim 7, wherein the usage criteria comprises a predetermined number of presentations of the requested asset.

10. The method of claim 7, wherein the usage criteria may be automatically reset after a period of time.

11. The method of claim 4, further comprising:
in response to determining that the received parental control access code is not valid:
simultaneously searching the local source and the remote source for an edited version of the same requested asset that does not violate parental controls; and
accessing the edited version; and
accessing, in response to determining that the received parental control access code is valid, the requested asset.

12. The method of claim 11 wherein searching for an edited version of the same requested asset comprises connecting to an edited content source.

13. The method of claim 12 wherein the edited content source is located remote from the user.

14. The method of claim 11 wherein the edited version comprises a version of asset edited for television.

15. The method of claim 11 wherein the edited version comprises a non-explicit version of a digital music asset.

16. The method of claim 11 wherein accessing the edited version comprises censoring the requested asset in real-time.

17. The method of claim 11 wherein the parental controls are selected from the group consisting of title locks, television rating locks, movie rating locks, channel locks, and website locks.

18. The method of claim 11 wherein the requested asset is selected from the group consisting of a movie, a television program, an on-demand program, a pay-per-view program, a recorded program, a digital music clip, a new program, an interactive application, an interactive game, a website, a newsgroup, and a chatroom.

19. The method of claim 1 further comprising determining the similarity between the requested asset and the available assets.

20. The method of claim 19 wherein determining the similarity between the requested asset and the available assets comprises determining the distances between the requested asset and the available assets.

21. The method of claim 20 wherein the distances between the requested asset and the available assets are based, at least in part, on at least one descriptor selected from the group consisting of the requested asset's genre, title, writer, director, description, artist, actor, asset type, sub-genre, and topic.

22. The method of claim 1 wherein the parental controls are selected from the group consisting of title locks, television rating locks, movie rating locks, channel locks, and website locks.

23. The method of claim 1 wherein the available assets are selected from the group consisting of movies, television programs, on-demand media, pay-per-view media, recorded media, digital music, news, interactive applications, interactive games, websites, newsgroups, and chat rooms.

24. A system for searching for assets that are permitted by parental controls, the system comprising:
a user input device;
memory for storing parental control settings; and
control circuitry configured to:
receive input from the user input device to access a requested asset, wherein the requested asset is selected from the group consisting of a video asset, a music asset, an image asset and a text asset;
determine whether accessing the requested asset violates the parental control settings stored in the memory; and
at the time the user input to access the requested asset is received and in response to determining that accessing the requested asset violates the parental control settings:
present a prompt, wherein said prompt comprises:
an indication of a type of parental control exceeded;
an option to enter a parental control access code; and
an option to simultaneously search a local source and a remote source for other available assets that do not violate parental controls.

25. The system of claim 24 wherein the control circuitry is further configured to:
present a search results display listing the available assets that do not violate the parental control settings; and
access at least one of the available assets directly from the search results display.

26. The system of claim 24 wherein the control circuitry is further configured to:
receive parental control access code input; and
determine whether the received parental control access code input is valid.

27. The system of claim 26 wherein the control circuitry is further configured to:
access the requested asset, in response to determining that the received parental control access code input is valid.

28. The system of claim 26 wherein the control circuitry is further configured to determine whether the received parental control access code input is expired.

29. The system of claim 28 wherein the control circuitry is further configured to determine if a usage criteria associated with the parental access code has been met.

30. The system of claim 29 wherein the usage criteria comprises a predetermined amount of content viewing associated with a particular rating.

31. The system of claim 29, wherein the usage criteria comprises a predetermined number of presentations of the requested asset.

32. The system of claim 29, wherein the usage criteria may be automatically reset after a period of time.

33. The system of claim 26, wherein the control circuitry is further configured to:
- in response to determining that the received parental control access code input is not valid:
  - simultaneously search the local source and the remote source for an edited version of the same requested asset that does not violate the parental control settings; and
  - access the edited version; and
- access the requested asset, in response to determining that the received parental control access code input is valid.

34. The system of claim 33 wherein the control circuitry is further configured to connect to an edited content source.

35. The system of claim 34 wherein the edited content source is located remote from the user.

36. The system of claim 33 wherein the edited version comprises a version of asset edited for television.

37. The system of claim 33 wherein the edited version comprises a non-explicit version of a digital music asset.

38. The system of claim 33 wherein the control circuitry is configured to access the edited version by censoring the requested asset in real-time.

39. The system of claim 33 wherein the parental control settings are selected from the group consisting of title locks, television rating locks, movie rating locks, channel locks, and website locks.

40. The system of claim 33 wherein the requested asset is selected from the group consisting of a movie, a television program, an on-demand program, a pay-per-view program, a recorded program, a digital music clip, a new program, an interactive application, an interactive game, a website, a newsgroup, and a chatroom.

41. The system of claim 24 wherein the control circuitry is further configured to determine the similarity between the requested asset and the available assets.

42. The system of claim 41 wherein the control circuitry is configured to determine the similarity between the requested asset and the available assets by determining the distances between the requested asset and the available assets.

43. The system of claim 42 wherein the distances between the requested asset and the available assets are based at least in part on at least one descriptor selected from the group consisting of the requested asset's genre, title, writer, director, artist, actor, description, asset type, sub-genre, and topic.

44. The system of claim 24 wherein the parental control settings are selected from the group consisting of title locks, television rating locks, movie rating locks, channel locks, and website locks.

45. The system of claim 24 wherein the available assets are selected from the group consisting of movies, television programs, on-demand media, pay-per-view media, recorded media, digital music, news, interactive applications, interactive games, websites, newsgroups, and chatrooms.

* * * * *